(12) United States Patent
Mikhaylik et al.

(10) Patent No.: US 11,489,348 B2
(45) Date of Patent: *Nov. 1, 2022

(54) MULTIPLEXED CHARGE DISCHARGE BATTERY MANAGEMENT SYSTEM

(71) Applicant: Sion Power Corporation, Tucson, AZ (US)

(72) Inventors: Yuriy V. Mikhaylik, Tucson, AZ (US); Glenn Alan Hamblin, Tucson, AZ (US); Chariclea Scordilis-Kelley, Tucson, AZ (US); John Joseph Christopher Kopera, Vail, AZ (US)

(73) Assignee: Sion Power Corporation, Tucson, AZ (US)

( * ) Notice: Subject to any disclaimer, the term of this patent is extended or adjusted under 35 U.S.C. 154(b) by 211 days.

This patent is subject to a terminal disclaimer.

(21) Appl. No.: 16/527,903

(22) Filed: Jul. 31, 2019

(65) Prior Publication Data
US 2020/0044460 A1    Feb. 6, 2020

Related U.S. Application Data

(60) Provisional application No. 62/712,761, filed on Jul. 31, 2018.

(51) Int. Cl.
*H02J 7/00* (2006.01)
*H01M 10/052* (2010.01)
(Continued)

(52) U.S. Cl.
CPC ......... *H02J 7/0019* (2013.01); *H01M 10/052* (2013.01); *H01M 10/425* (2013.01);
(Continued)

(58) Field of Classification Search
CPC ...... H02J 7/0019; H02J 7/0047; H02J 7/0021; H01M 10/052; H01M 10/425;
(Continued)

(56) References Cited

U.S. PATENT DOCUMENTS 5,506,068 A   4/1996   Dan et al.
5,543,245 A   8/1996   Andrieu et al.
(Continued)

FOREIGN PATENT DOCUMENTS

BR   102016009787 A2 *  11/2017
CN   101292380 B   *   8/2010
(Continued)

OTHER PUBLICATIONS

International Search Report and Written Opinion for PCT/US2019/044330 dated Oct. 22, 2019.
(Continued)

*Primary Examiner* — Naum Levin
(74) *Attorney, Agent, or Firm* — Wolf, Greenfield & Sacks, P.C.

(57) ABSTRACT

A battery management system comprising: at least one battery comprising two or more sets of cells, each set of cells comprising one or more cells; a multiplexing switch apparatus connected to each set of cells; and at least one controller configured to use the multiplexing switch apparatus to selectively discharge the sets of cells based on at least one criterion. A battery pack comprising: at least one battery comprising two or more sets of cells, each set of cells comprising one or more cells; and an integrated switching control system comprising at least one switch connected to each set of cells, wherein the integrated switching control system is configured to control the at least one switch to discharge the sets of cells sequentially or selectively based on at least one criterion. A battery management method or a battery pack control method.

17 Claims, 14 Drawing Sheets

(51) Int. Cl.
*H01M 10/42* (2006.01)
*H01M 10/44* (2006.01)

(52) U.S. Cl.
CPC ....... *H01M 10/441* (2013.01); *H01M 10/443* (2013.01); *H01M 10/445* (2013.01); *H02J 7/0021* (2013.01); *H02J 7/0047* (2013.01); *H01M 2010/4271* (2013.01)

(58) Field of Classification Search
CPC ............. H01M 10/441; H01M 10/443; H01M 10/445; H01M 2010/4271
See application file for complete search history.

(56) References Cited

U.S. PATENT DOCUMENTS

| | | | |
|---|---|---|---|
| 5,648,187 A | 7/1997 | Skotheim | |
| 5,818,201 A | 10/1998 | Stockstad et al. | |
| 5,914,606 A | 6/1999 | Becker-Irvin | |
| 5,919,587 A | 7/1999 | Mukherjee et al. | |
| 5,961,672 A | 10/1999 | Skotheim et al. | |
| 6,238,821 B1 | 5/2001 | Mukherjee et al. | |
| 6,329,789 B1 | 12/2001 | Gavrilov et al. | |
| 6,733,924 B1 | 5/2004 | Skotheim et al. | |
| 6,746,804 B2 | 6/2004 | Gan et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,494,729 B2 | 2/2009 | Odaohhara | |
| 7,579,112 B2* | 8/2009 | Chiang | H01G 11/24 429/209 |
| 7,688,075 B2 | 3/2010 | Kelley et al. | |
| 7,771,870 B2 | 8/2010 | Affinito et al. | |
| 7,785,730 B2 | 8/2010 | Affinito et al. | |
| 7,939,198 B2 | 5/2011 | Mukherjee et al. | |
| 8,076,024 B2 | 12/2011 | Affinito et al. | |
| 8,084,102 B2 | 12/2011 | Affinito | |
| 8,087,309 B2 | 1/2012 | Kelley et al. | |
| 8,105,717 B2 | 1/2012 | Skotheim et al. | |
| 8,197,971 B2 | 6/2012 | Skotheim et al. | |
| 8,264,205 B2 | 9/2012 | Kopera | |
| 8,330,419 B2* | 12/2012 | Kim | H01M 10/4257 320/121 |
| 8,338,034 B2 | 12/2012 | Affinito et al. | |
| 8,405,351 B2 | 3/2013 | Chaturvedi et al. | |
| 8,415,054 B2 | 4/2013 | Skotheim et al. | |
| 8,508,191 B2* | 8/2013 | Kim | H02J 7/0024 320/121 |
| 8,603,680 B2 | 12/2013 | Affinito et al. | |
| 8,617,748 B2 | 12/2013 | Mikhaylik et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 8,760,118 B2* | 6/2014 | Christensen | H01M 10/482 320/128 |
| 8,871,387 B2 | 10/2014 | Wang et al. | |
| 8,928,286 B2 | 1/2015 | Amiruddin et al. | |
| 8,936,870 B2 | 1/2015 | Affinito et al. | |
| 8,968,928 B2 | 3/2015 | Wang et al. | |
| 9,005,311 B2 | 4/2015 | Safont et al. | |
| 9,005,809 B2 | 4/2015 | Wilkening et al. | |
| 9,034,421 B2 | 5/2015 | Mikhaylik et al. | |
| 9,040,197 B2 | 5/2015 | Affinito et al. | |
| 9,040,201 B2 | 5/2015 | Affinito et al. | |
| 9,065,149 B2 | 6/2015 | Skotheim et al. | |
| 9,077,041 B2 | 7/2015 | Burnside et al. | |
| 9,105,938 B2 | 8/2015 | Scordilis-Kelley et al. | |
| 9,214,678 B2 | 12/2015 | Mikhaylik | |
| 9,397,342 B2 | 7/2016 | Skotheim et al. | |
| 9,419,274 B2 | 8/2016 | Wilkening et al. | |
| 9,490,478 B2 | 11/2016 | Mikhaylik et al. | |
| 9,531,009 B2 | 12/2016 | Kumaresan et al. | |
| 9,548,492 B2 | 1/2017 | Affinito et al. | |
| 9,559,348 B2 | 1/2017 | Kumaresan et al. | |
| 9,577,243 B2 | 2/2017 | Schmidt et al. | |
| 9,577,267 B2 | 2/2017 | Scordilis-Kelley et al. | |
| 9,583,757 B2 | 2/2017 | Park et al. | |
| 9,653,735 B2 | 5/2017 | Skotheim et al. | |
| 9,653,750 B2 | 5/2017 | Laramie et al. | |
| 9,711,784 B2 | 7/2017 | Kelley et al. | |
| 9,728,768 B2 | 8/2017 | Mikhaylik et al. | |
| 9,735,411 B2 | 8/2017 | Viner et al. | |
| 9,755,268 B2 | 9/2017 | Fleischmann et al. | |
| 9,780,404 B2 | 10/2017 | Scordilis-Kelley et al. | |
| 9,812,732 B2* | 11/2017 | Jiang | H01M 10/441 |
| 9,825,328 B2 | 11/2017 | Du et al. | |
| 9,853,287 B2 | 12/2017 | Mikhaylik et al. | |
| 9,914,368 B1* | 3/2018 | Marcicki | B60L 50/64 |
| 9,947,963 B2 | 4/2018 | Du et al. | |
| 9,994,959 B2 | 6/2018 | Laramie et al. | |
| 9,994,960 B2 | 6/2018 | Laramie et al. | |
| 10,020,479 B2 | 7/2018 | Mikhaylik et al. | |
| 10,020,512 B2 | 7/2018 | Gronwald et al. | |
| 10,050,308 B2 | 8/2018 | Liao et al. | |
| 10,069,135 B2 | 9/2018 | Fleischmann et al. | |
| 10,069,146 B2 | 9/2018 | Skotheim et al. | |
| 10,099,562 B2* | 10/2018 | Jin | B60L 50/60 |
| 10,122,043 B2 | 11/2018 | Du et al. | |
| 10,243,202 B2 | 3/2019 | Fleischmann et al. | |
| 10,312,545 B2 | 6/2019 | Scordilis-Kelley et al. | |
| 10,319,988 B2 | 6/2019 | Kelley et al. | |
| 10,320,027 B2 | 6/2019 | Scordilis-Kelley et al. | |
| 10,320,031 B2 | 6/2019 | Mikhaylik et al. | |
| 10,333,134 B2 | 6/2019 | Mikhaylik et al. | |
| 10,333,149 B2 | 6/2019 | Affinito et al. | |
| 10,388,943 B2 | 8/2019 | Bonhomme et al. | |
| 10,388,987 B2 | 8/2019 | Du et al. | |
| 10,868,344 B2* | 12/2020 | Masias | H01M 10/4264 |
| 10,965,130 B2* | 3/2021 | Mikhaylik | H02J 7/0063 |
| 11,056,728 B2 | 7/2021 | Mikhaylik et al. | |
| 2005/0196672 A1 | 9/2005 | Mukherjee et al. | |
| 2006/0115579 A1 | 6/2006 | Mukherjee et al. | |
| 2006/0193095 A1 | 8/2006 | Hunter et al. | |
| 2007/0111089 A1* | 5/2007 | Swan | H01M 10/0413 429/160 |
| 2007/0221265 A1 | 9/2007 | Affinito et al. | |
| 2008/0318128 A1 | 12/2008 | Simoneau et al. | |
| 2009/0035646 A1 | 2/2009 | Mikhaylik et al. | |
| 2009/0055110 A1 | 2/2009 | Kelley et al. | |
| 2010/0035128 A1 | 2/2010 | Scordilis-Kelley et al. | |
| 2010/0237830 A1 | 9/2010 | Castelaz et al. | |
| 2010/0239914 A1 | 9/2010 | Mikhaylik et al. | |
| 2011/0006738 A1 | 1/2011 | Mikhaylik et al. | |
| 2011/0014524 A1 | 1/2011 | Skotheim et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0159376 A1 | 6/2011 | Skotheim et al. | |
| 2011/0165471 A9 | 7/2011 | Skotheim et al. | |
| 2011/0177398 A1 | 7/2011 | Affinito et al. | |
| 2011/0206992 A1 | 8/2011 | Campbell et al. | |
| 2011/0256450 A1 | 10/2011 | Campbell et al. | |
| 2012/0048729 A1 | 3/2012 | Mikhaylik et al. | |
| 2012/0052339 A1 | 3/2012 | Mikhaylik et al. | |
| 2012/0070746 A1 | 3/2012 | Mikhaylik et al. | |
| 2012/0082872 A1 | 4/2012 | Schmidt et al. | |
| 2012/0082901 A1 | 4/2012 | Schmidt et al. | |
| 2012/0228939 A1* | 9/2012 | Kaga | H02J 7/35 307/43 |
| 2012/0306275 A1* | 12/2012 | Christensen | H01M 10/482 307/80 |
| 2013/0207616 A1 | 8/2013 | Shim | |
| 2013/0221918 A1* | 8/2013 | Hill | H02J 7/34 320/109 |
| 2013/0316072 A1 | 11/2013 | Scordilis-Kelley et al. | |
| 2013/0330577 A1* | 12/2013 | Kristofek | H01M 10/445 429/50 |
| 2014/0062411 A1 | 3/2014 | Mikhaylik et al. | |
| 2014/0272565 A1 | 9/2014 | Gronwald et al. | |
| 2014/0272594 A1 | 9/2014 | Safont et al. | |
| 2014/0272595 A1 | 9/2014 | Cristadoro et al. | |
| 2014/0376270 A1* | 12/2014 | Kern | H02M 3/3376 363/17 |

(56) References Cited

U.S. PATENT DOCUMENTS

| | | | |
|---|---|---|---|
| 2015/0048796 A1 | 2/2015 | Sherstyuk et al. | |
| 2015/0050527 A1* | 2/2015 | Jiang | H01M 10/425 429/9 |
| 2015/0162586 A1 | 6/2015 | Fleischmann et al. | |
| 2015/0188194 A1 | 7/2015 | Mikhaylik et al. | |
| 2015/0236322 A1 | 8/2015 | Laramie et al. | |
| 2015/0270710 A1* | 9/2015 | Carver | H02J 7/0024 307/109 |
| 2015/0287986 A1 | 10/2015 | Affinito et al. | |
| 2016/0072132 A1 | 3/2016 | Liao et al. | |
| 2016/0118638 A1 | 4/2016 | Gronwald et al. | |
| 2016/0118651 A1 | 4/2016 | Kovalev et al. | |
| 2016/0276843 A1* | 9/2016 | Chang | H01M 10/44 |
| 2016/0344067 A1 | 11/2016 | Laramie et al. | |
| 2017/0018815 A1 | 1/2017 | Laramie et al. | |
| 2017/0047590 A1 | 2/2017 | Mikhaylik et al. | |
| 2017/0141385 A1 | 5/2017 | Scordilis-Kelley et al. | |
| 2017/0141402 A1 | 5/2017 | Affinito et al. | |
| 2017/0250390 A1 | 8/2017 | Laramie et al. | |
| 2017/0338475 A1 | 11/2017 | Laramie et al. | |
| 2018/0006303 A1 | 1/2018 | Mikhaylik et al. | |
| 2018/0138542 A1 | 5/2018 | Bunte et al. | |
| 2018/0183261 A1 | 6/2018 | Kwak et al. | |
| 2018/0230610 A1 | 8/2018 | Laramie et al. | |
| 2018/0254516 A1 | 9/2018 | Han et al. | |
| 2018/0261820 A1 | 9/2018 | Liao et al. | |
| 2018/0269520 A1 | 9/2018 | Scordilis-Kelley et al. | |
| 2018/0277850 A1 | 9/2018 | Quero-Mieres et al. | |
| 2018/0287122 A1 | 10/2018 | Mikhaylik et al. | |
| 2018/0292465 A1 | 10/2018 | Osara et al. | |
| 2018/0301697 A1 | 10/2018 | Affinito et al. | |
| 2018/0337406 A1 | 11/2018 | Mudalige et al. | |
| 2018/0351148 A1 | 12/2018 | Schneider et al. | |
| 2018/0351158 A1 | 12/2018 | Liao et al. | |
| 2018/0358651 A1 | 12/2018 | Liao et al. | |
| 2018/0375155 A1 | 12/2018 | Liao et al. | |
| 2019/0006699 A1 | 1/2019 | Jones et al. | |
| 2019/0036336 A1* | 1/2019 | Kuznetsov | H02J 7/0068 |
| 2019/0088958 A1 | 3/2019 | Viner et al. | |
| 2019/0229323 A1 | 7/2019 | Mikhaylik et al. | |
| 2019/0267632 A1 | 8/2019 | Affinito et al. | |
| 2019/0267669 A1 | 8/2019 | Mikhaylik et al. | |
| 2020/0259341 A1 | 8/2020 | Mikhaylik et al. | |
| 2021/0135294 A1 | 5/2021 | Mikhaylik et al. | |
| 2021/0135297 A1 | 5/2021 | Mikhaylik et al. | |
| 2021/0328274 A1 | 10/2021 | Mikhaylik et al. | |
| 2022/0069593 A1 | 3/2022 | Hamblin et al. | |

FOREIGN PATENT DOCUMENTS

| | | | | |
|---|---|---|---|---|
| CN | 104838560 B | * | 6/2017 | H02J 7/14 |
| DE | 10 2014 212122 A1 | | 1/2016 | |
| EP | 0 981 194 A2 | | 2/2000 | |
| GB | 2569140 A | | 6/2019 | |
| JP | 2009181907 A | * | 8/2009 | |
| KR | 20100098550 A | * | 9/2010 | H02J 7/0026 |
| KR | 20150028775 A | * | 3/2015 | H01M 8/143 |
| RU | 2683235 C1 | * | 3/2019 | |
| WO | WO-2011139675 A1 | * | 11/2011 | B60L 53/302 |
| WO | WO 2012/167019 A1 | | 12/2012 | |
| WO | WO-2015075508 A1 | * | 5/2015 | H02M 3/33523 |
| WO | WO 2015/193041 A1 | | 12/2015 | |
| WO | WO-2016100262 A1 | * | 6/2016 | H02J 7/345 |
| WO | WO 2020/028485 A1 | | 2/2020 | |
| WO | WO 2021/086377 A1 | | 5/2021 | |

OTHER PUBLICATIONS

Office Communication for U.S. Appl. No. 16/794,097 dated Aug. 20, 2020.

International Search Report and Written Opinion for PCT/US2019/059142 dated May 20, 2020.

Office Communication for U.S. Appl. No. 16/670,933 dated Jan. 8, 2021.

Office Action for U.S. Appl. No. 16/670,905 dated Nov. 22, 2021.

Louli et al., Exploring the Impact of Mechanical Pressure on the Performance of Anode-Free Lithium Metal Cells. J Electrochem Soc. Apr. 18, 2019;166:A1291-9.

Louli et al., Optimizing Cycling Conditions for Anode-Free Lithium Metal Cells. J Electrochem Soc. Feb. 5, 2021;168:020515. 15 pages.

\* cited by examiner

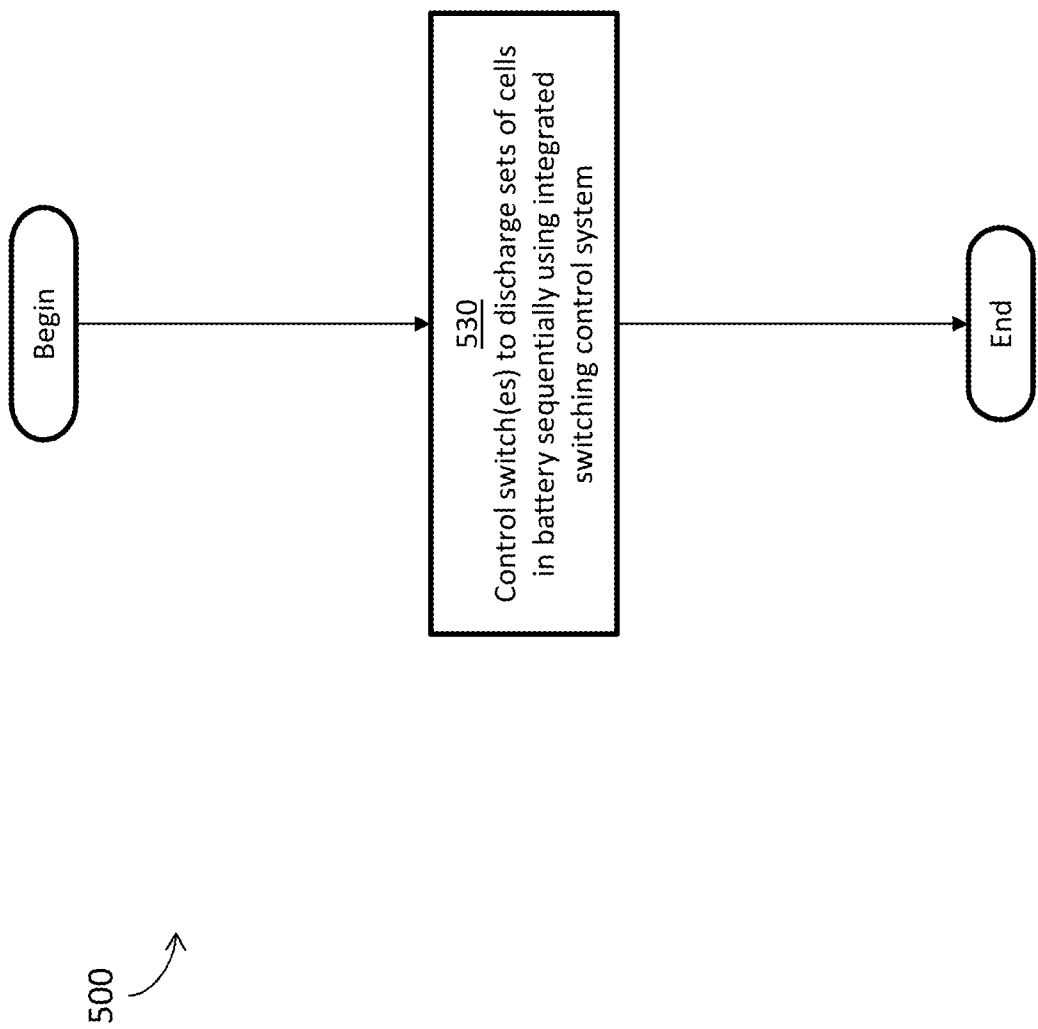

MULTIPLEXED CHARGE DISCHARGE BATTERY MANAGEMENT SYSTEM

RELATED APPLICATIONS

This application claims priority under 35 U.S.C. § 119(e) to U.S. Provisional Application No. 62/712,761, filed Jul. 31, 2018, and entitled "Multiplexed Charge Discharge Battery Management System," which is incorporated herein by reference in its entirety for all purposes.

TECHNICAL FIELD

Charge/discharge management of electrochemical cells, and related systems, are generally described.

BACKGROUND

Conventionally, batteries have failed to compete successfully with established power sources such as combustion engines in various industries, such as vehicles. One reason for this failure has been that battery users have been dissatisfied with the longevity and performance that batteries have conventionally provided.

SUMMARY

Some embodiments of the invention are directed to a battery management system comprising: at least one battery comprising two or more sets of cells, each set of cells comprising one or more cells; a multiplexing switch apparatus connected to each set of cells; and at least one controller configured to use the multiplexing switch apparatus to selectively discharge the sets of cells based on at least one criterion.

Some other embodiments are directed to a battery pack comprising: at least one battery comprising two or more sets of cells, each set of cells comprising one or more cells; and an integrated switching control system comprising at least one switch connected to each set of cells, wherein the integrated switching control system is configured to control the at least one switch to discharge the sets of cells sequentially.

Still other embodiments are directed to a battery pack comprising: at least one battery comprising two or more sets of cells, each set of cells comprising one or more cells; and an integrated switching control system comprising at least one switch connected to each set of cells, wherein the integrated switching control system is configured to control the at least one switch to selectively discharge the sets of cells based on at least one of: a duration of a connection between a load and a set of cells currently connected to the load, a delivered discharge capacity at the connection, and a value of a function having one or more parameters.

Further embodiments are directed to a battery management method. The method may comprise using a multiplexing switch apparatus, which is connected to two or more sets of cells of at least one battery, to selectively discharge each set of cells based on at least one criterion. In some embodiments, each set of cells may comprise one or more cells.

Additional embodiments are directed to a battery pack control method. The method may comprise using an integrated switching control system comprising at least one switch connected to each set of cells of two or more sets of cells of at least one battery, to control the at least one switch to discharge the sets of cells sequentially. In some embodiments, each set of cells may comprise one or more cells.

Some other embodiments are directed to a battery pack control method comprising using an integrated switching control system comprising at least one switch connected to each set of cells of two or more sets of cells of at least one battery, to control the at least one switch to selectively discharge the sets of cells based on at least one of: a duration of a connection between a load and a set of cells currently connected to the load, a delivered discharge capacity at the connection, and a value of a function having one or more parameters, wherein each set of cells comprises one or more cells.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 5 is a flow chart depicting a representative process for controlling a battery pack, according to some embodiments.

DETAILED DESCRIPTION

Figure 1:
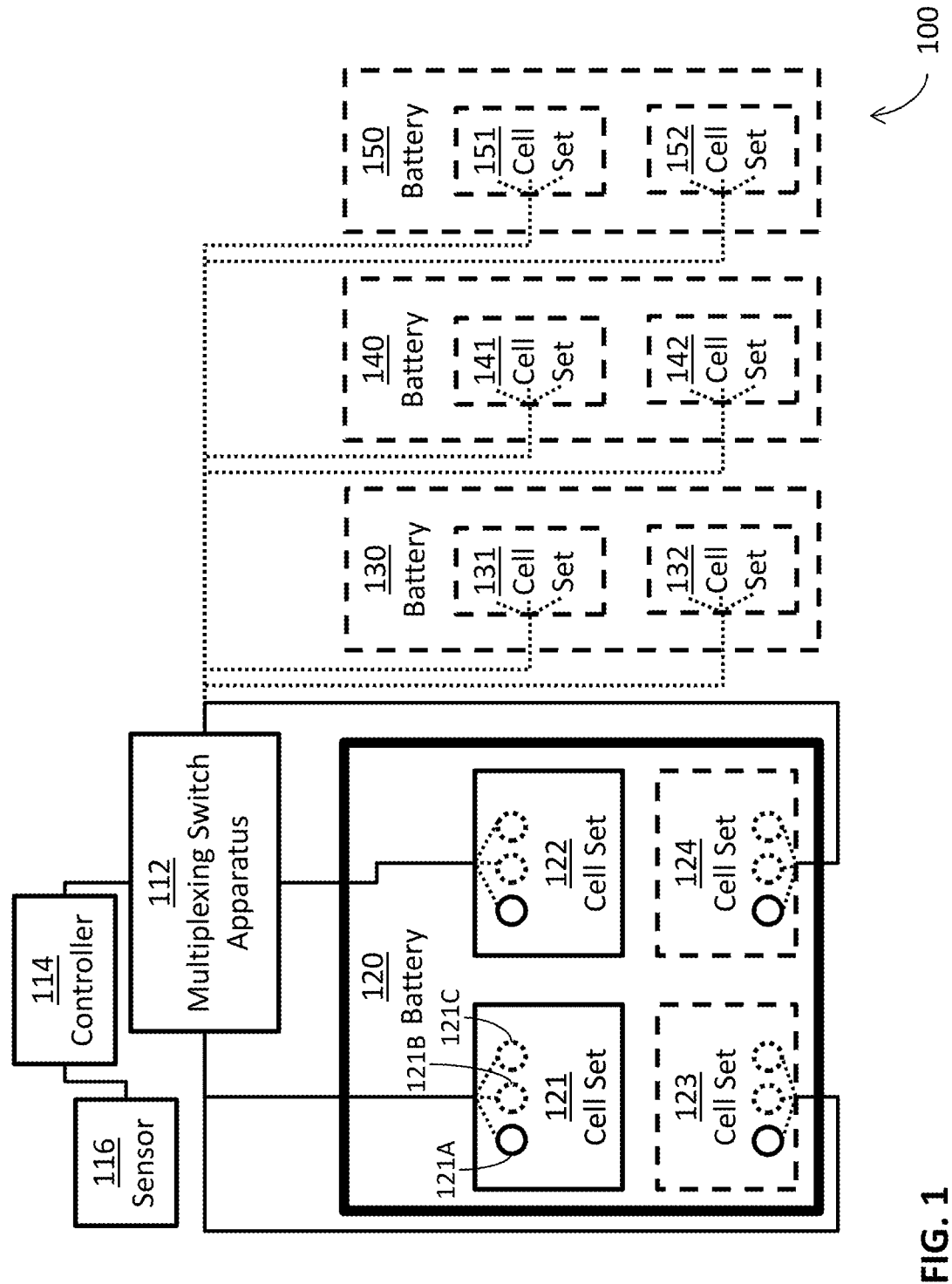
FIG. 1 is a block diagram illustrating a representative battery management system, according to some embodiments.

The inventors have recognized and appreciated that conventional techniques for battery management have resulted in the previously poor longevity and performance of batteries. For example, batteries have suffered a short cycle life (e.g., a low number of complete charge and discharge cycles before capacity falls below 80% of original capacity), particularly where charge and discharge rates are similar, or where the charge rate is higher than the discharge rate. For example, many users of batteries have desired batteries to have nearly identical charge and discharge rates (e.g., 4 hours to charge and 4 hours to discharge), and battery manufacturers have provided batteries and battery management systems that provide such nearly identical rates. Many users have also desired batteries to charge at higher rates than they discharge (e.g., 30 minutes to charge and 4 hours to discharge), such as to reduce inconvenience of waiting for charging to use the batteries.

The inventors have recognized and appreciated that the cycle life of batteries, and consequently the longevity and performance of batteries, may be greatly improved by employing higher ratios of discharge rate to charge rate. Furthermore, the inventors have recognized and appreciated that these ratios may be employed by providing a battery management system that controls the cells within the batteries to provide such ratios. For example, some embodiments are directed to a battery management system that multiplexes cells such that the cells can be charged all at once or with multiple at a time and discharged individually or in smaller sets. This may result in actual ratios of discharge rate to charge rate for the cells that improve their cycle life, while providing whatever output rates that are desired or required for particular loads and applications. Furthermore, the inventors have recognized and appreciated that discharging some but not all of the cells at once with homogeneous current distribution may also improve their cycle life.

For example, with a battery having 4 cells, 1 cell could be discharged at a time at 0.5 amps for 3 hours each, and then all 4 cells could be charged at 0.5 amps for 12 hour—such a configuration would provide an actual ratio of discharge rate to charge rate of 4:1, while the ratio from the user's perspective would be 1:1 because the cells are discharged individually for 3 hours each (totaling 12 hours of discharge time). The inventors have recognized and appreciated that such a battery management system may actually improve the cycle life of batteries while still providing users what they desire or need from the batteries. In some embodiments, the functionality providing this duo of benefits may be hidden from users and may be integrated into the cell blocks and/or batteries themselves.

The inventors have recognized and appreciated that the cycle life of batteries may be further improved by monitoring the cycles of the cells and various properties (such as the duration of a connection between a load and a cell or cells currently connected to the load, or a more complex function considering multiple parameters) and selecting which cells to discharge when based on this monitoring, especially compared to conventional techniques, which relied on much simpler selection processes like "round robin" or considering a number of prior discharge cycles.

FIG. 1 depicts a representative battery management system 100. In some embodiments, representative system 100 may include a multiplexing switch apparatus (e.g., 112), a controller (e.g., 114), one or more sensors (e.g., 116), and one or more batteries (e.g., 120, 130, 140, 150, and so on). It should be appreciated that although only a single multiplexing switch apparatus 112, controller 114, sensor 116, and only four batteries 120-150 are shown in FIG. 1, any suitable number of these components may be used. Any of numerous different modes of implementation may be employed. Furthermore, although a label in the singular is used herein to reference a multiplexing switch apparatus, it should be appreciated that the components used for the multiplexing and switching described herein may be distributed across any suitable number of devices (e.g., switches).

According to some embodiments, the battery or batteries may include at least one lithium-metal battery. Additionally, the battery or batteries (e.g., 120-150) may respectively include one or more cell sets (e.g., 121-124, 131-132, 141-142, 151-152, and so on), referred to also as sets of cells. In some embodiments, two or more sets of cells are included in each battery, such as 121-122 and so on. Additionally, each set of cells (e.g., cell set 121) may include one or more cells (e.g., 121A-121C). In some embodiments, each set of cells may have a single cell. Alternatively, each set of cells may include multiple cells and may form a cell "block," or multiple sets of cells may together form a cell block. Additionally, each cell (either in a battery, all the batteries in a battery pack, or in a set of cells) or set of cells may utilize the same electrochemistry. That is to say, in some embodiments, each cell may make use of the same anode active material and the same cathode active material.

In some embodiments, a multiplexing switch apparatus (e.g., 112) may include an array of switches, such as those further described in relation to FIGS. 3A and 3B below. Additionally, the multiplexing switch apparatus may be connected to each set of cells and/or to each cell individually. In some embodiments, the controller, such as 114, may use the multiplexing switch apparatus to selectively discharge the cells or sets of cells based on at least one criterion.

For example, the criterion may include a sequence in which to discharge the cells or sets of cells, such as a predefined numbering or order associated with the sets of cells (e.g., starting with a first set, switching through each set to the last set, and then starting over with the first set), and/or an order based on the cell(s) or set(s) of cells with the next highest voltage or some other measure indicating the next strongest. The inventors have recognized and appreciated that using a sequence, especially a predefined numbering, may reduce the complexity of the operations performed by the system (e.g., a controller that is not a microprocessor) and may be usable by a wider array of systems.

Alternatively or additionally, the criterion may be context-sensitive, such as by considering any one or more of the following: a duration of a connection between a load and a set of cells currently connected to the load (which may be at least 0.01 seconds in some embodiments), a delivered discharge capacity at the connection, and the value of a function having one or more parameters. In certain embodiments, the criterion may not include a number of prior discharge cycles of the set of cells.

In some embodiments, the function may have parameters such as any one or more of the following: a capacity accumulated over several connections between the load and the set of cells, the delivered discharge capacity at the connection, a current of the set of cells, a voltage of the set of cells and/or of at least one other set of cells, a cutoff discharge voltage of the set of cells, a power of the set of cells, an energy of the set of cells, a number of charge or discharge cycles of the set of cells, an impedance of the set of cells, a rate of voltage fading of the set of cells during the connection, a temperature of the set of cells, and a pressure of the set of cells (e.g., the pressure on the cell(s) from their physical enclosure, which may indicate cell capacity and is discussed further below). According to some embodiments, the delivered discharge capacity at a single connection may be in the range from 0.01% of nominal capacity to 100% (e.g., 95%) of set nominal capacity.

In some embodiments, a sensor (e.g., 116) may measure the criterion and/or any of the parameters of the function. For example, the sensor may include a current sensor that measures the current in amperes of a given set of cells. It should be appreciated that the criterion may be plural or singular and may relate to the currently discharging set of cells and/or may determine the next set of cells.

In some embodiments, the controller (e.g., 114) may include one or more processors, which may be of whatever complexity is suitable for the application. For example, evaluating the function of the criterion in some embodiments may rely on a microprocessor forming part or all of the controller.

In some embodiments, the controller may use the multiplexing switch apparatus to selectively discharge and charge the cells or sets of cells at different, programmable rates. For example, the controller may use the multiplexing switch apparatus to selectively discharge the cells or sets of cells at a first rate at least 2 times higher than a second rate of charging the sets of cells (i.e., discharging twice as fast as charging). Alternatively or additionally, the first rate of discharging may be at least 4 times higher than the second rate of charging the sets of cells (i.e., discharging four times as fast as charging). The inventors have recognized and appreciated that such ratios of discharge rate to charge rate may improve the performance and cycle life of the cells.

According to some embodiments, the controller may temporally overlap the discharge of the sets of cells. For example, before a given cell or set of cells ceases discharging, another cell or set of cells may begin discharging. In some embodiments, the controller may continue to provide power from the sets of cells during switching between different sets. The inventors have recognized and appreciated that this temporal overlap of discharging and continuation of power may maintain the power requirements of the load even during transition between different cells of sets of cells, which may further improve the cycle life of the cell(s) compared to conventional techniques. Accordingly, multiple cells may discharge simultaneously during such an overlap. Additionally, such an overlap may provide smoother transition of voltage than has been possible with conventional techniques.

In some embodiments, the load may be at least one component of a vehicle. The vehicle may be any suitable vehicle, adapted for travel on land, sea, and/or air. For example, the vehicle may be an automobile, truck, motorcycle, boat, helicopter, airplane, and/or any other suitable type of vehicle.

Alternatively or additionally, the controller may use the multiplexing switch apparatus (e.g., 112) to connect the sets of cells to a load in a topology employed or required by the load.

In some embodiments, the controller may use the multiplexing switch apparatus (e.g., 112) to isolate a single set of cells for discharging while other sets of cells are not discharging. Alternatively or additionally, a single cell may be isolated at a time. For example, the controller may use the multiplexing switch apparatus to isolate a single set of cells or a single cell for discharging while the other cells or sets of cells are not discharging. For a given cycle, each cell may be discharged once before any cell is discharged twice, according to some embodiments (e.g., where sequential discharging is used, but not limited to such embodiments).

As for charging, in some embodiments the controller may use the multiplexing switch apparatus to charge the sets of cells, and/or cells within a set, in parallel. For example, all the cells in the cell block, battery, or batteries may be charged in parallel at a rate one-fourth of the rate of discharge.

Figure 2:
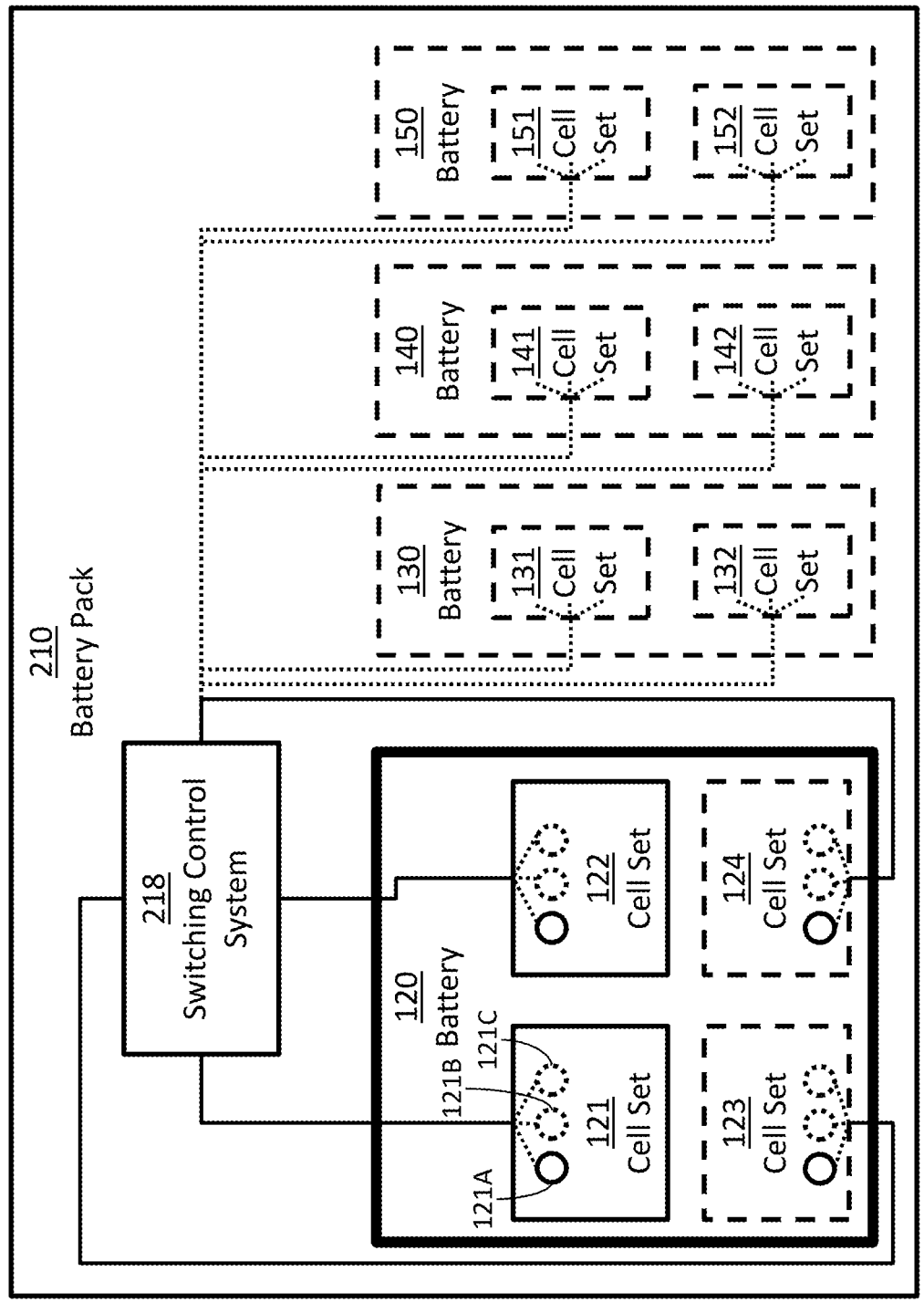
FIG. 2 is a block diagram illustrating a representative battery pack, according to some embodiments.

FIG. 2 depicts a representative battery pack 210. In some embodiments, representative battery pack 210 may include a switching control system (e.g., 218) and one or more batteries (e.g., 120, 130, 140, 150, and so on). It should be appreciated that although only a single switching control system 218 and only four batteries 120-150 are shown in FIG. 2, any suitable number of these components may be used. Any of numerous different modes of implementation may be employed. Furthermore, although a label in the singular is used herein to reference a switching control system, it should be appreciated that the components used for the control and switching described herein may be distributed across any suitable number of devices (e.g., switches, controller(s), etc.).

In some embodiments, a switching control system (e.g., 218) may include an array of switches, such as those further described in relation to FIGS. 3A and 3B below, and it may include a controller. Additionally, the switching control system may be connected to each set of cells and/or to each cell of the batteries individually, as discussed regarding FIG. 1 above. In some embodiments, the switching control system may be integrated into the battery pack. Additionally, the switching control system may control the switch(es) (such as in a switch array) to discharge the cells or sets of cells sequentially, such as in a predefined order associated with the cells or sets of cells. Alternatively or additionally, the switching control system may control the switch(es) to discharge the cells or sets of cells based on any one or more of the following: a duration of a connection between a load and a set of cells currently connected to the load (which may be at least 0.01 seconds in some embodiments), a delivered discharge capacity at the connection, and the value of a function. In certain embodiments, the basis for the control may not include a number of prior discharge cycles of the set of cells.

According to some embodiments, the switching control system may perform any number of other functions, such as those of the controller described in relation to FIG. 1 above.

It should be appreciated that any of the components of representative system 100 or representative battery pack 210 may be implemented using any suitable combination of hardware and/or software components. As such, various components may be considered a controller that may employ any suitable collection of hardware and/or software components to perform the described function.

Figure 3A:
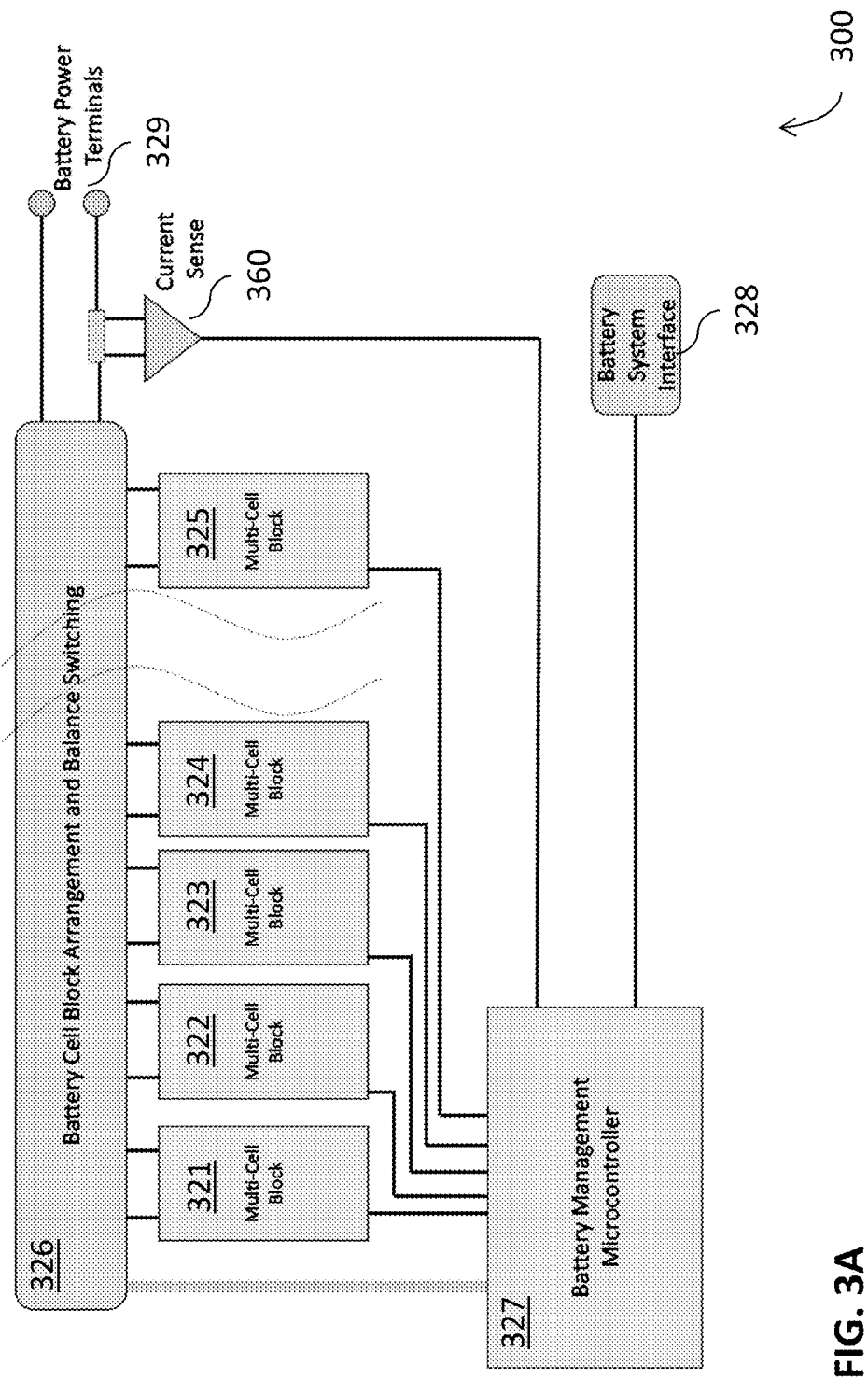
FIG. 3A is a block diagram illustrating a representative battery management system, according to some embodiments.

FIG. 3A depicts a representative battery management system 300. In some embodiments, representative system 300 may include any suitable number of multi-cell blocks (e.g., 321-325), a battery cell block arrangement and balance switch configuration (e.g., 326), a battery management microcontroller (e.g., 327), a battery system interface (e.g., 328), battery power terminals (e.g., 329), and a sensor (e.g., 360). The multi-cell blocks may be connected to the battery cell block arrangement and balance switch configuration. The multi-cell blocks may also be connected to the battery management microcontroller.

In some embodiments, the battery cell block arrangement and balance switch configuration may include switch multiplexing, which may connect the cell blocks (e.g., 321-325) in the series, parallel, serial/parallel, or any other suitable topology required to meet the voltage and current requirements of a given application or load.

According to some embodiments, the battery management microcontroller may monitor and control the charging and discharging of the battery management system to ensure the safe operation of the system and its components. Additionally, the battery management microcontroller may communicate with a user (e.g., a consumer using the system to power a load) as well as with any suitable internal production, calibration, and test equipment. For example, the battery management microcontroller may be connected to the battery system interface (e.g., 328), which may provide the interface required for the battery management microcontroller to communicate with the user as well as internal production, calibration, and test equipment, and any other suitable entity.

In some embodiments, the sensor may be connected to the battery cell block arrangement and balance switch configuration, the battery management microcontroller, and/or the battery power terminals, and it may the measure attributes of the multi-cell blocks and/or any other component of the system. For example, the sensor may measure attributes of the multi-cell blocks that form a criterion and/or any of the parameters of a function as described above. For example, the sensor may include a current sensor that measures the current in amperes of a given set of cells.

It should be appreciated that although battery cell block arrangement and balance switch configuration 326, battery management microcontroller 327, battery system interface 328, and sensor 360 appear in singular form, and only five multi-cell blocks 321-325 are shown in FIG. 3A, any suitable number of these components may be used and they may represent multiple components. Any of numerous different modes of implementation may be employed. Indeed, although a label in the singular is used herein to reference a battery cell block arrangement and balance switch configuration, it should be appreciated that the components used for the arrangement and balance switching described herein may be distributed across any suitable number of devices (e.g., switches).

Figure 3B:
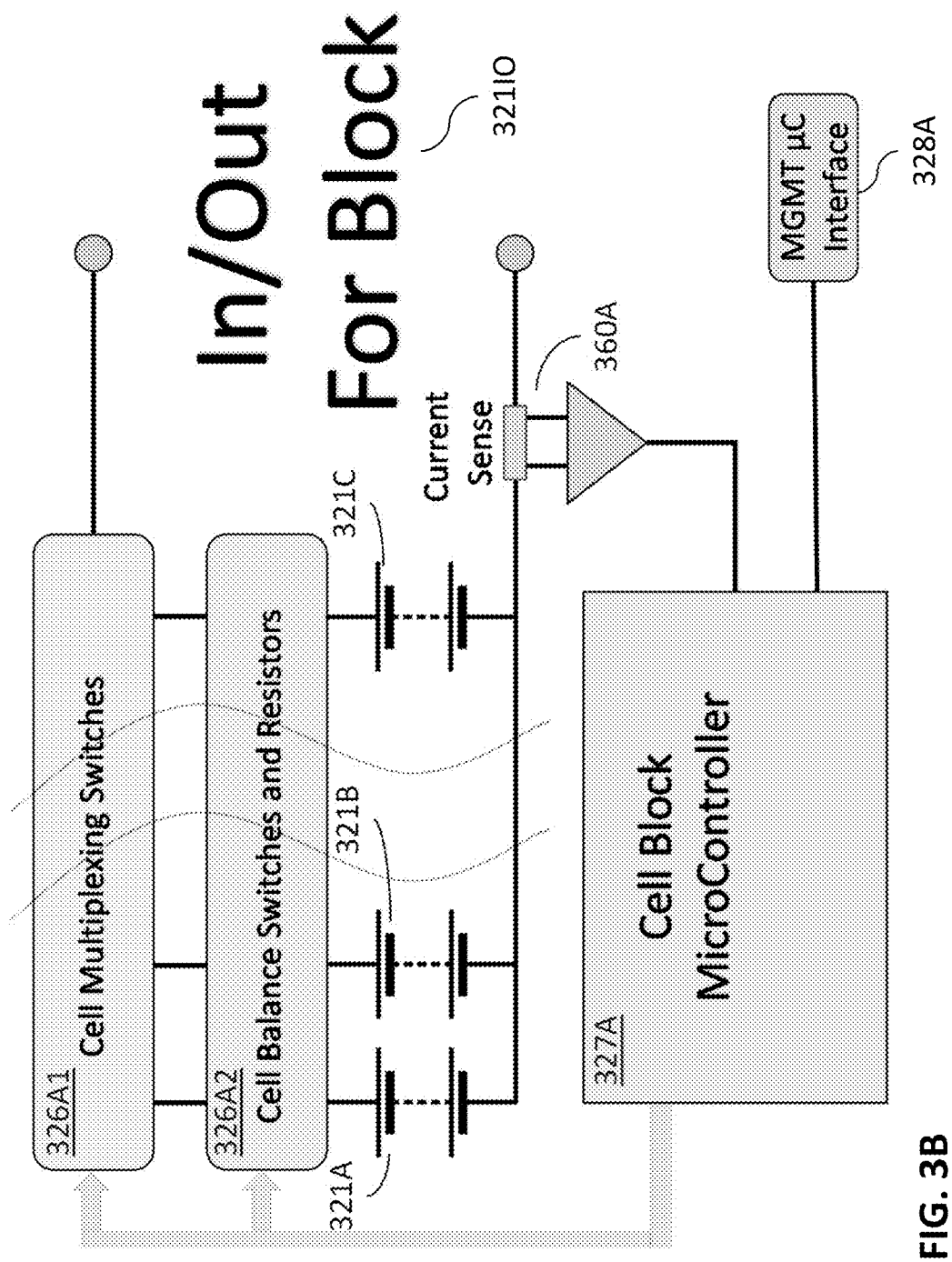
FIG. 3B is a block diagram illustrating a representative cell set and corresponding components, according to some embodiments.

FIG. 3B depicts a representative cell set and corresponding components. In some embodiments, the representative cell set may include any suitable number of cells (e.g., 321A-C) and may constitute a multi-cell block, such as is described above. Additionally, the representative cell set may include cell multiplexing switches (e.g., 326A1), cell balance switches and resistors (e.g., 326A2), a cell block microcontroller (e.g., 327A), a battery management microcontroller interface (e.g., 328A), a sensor (e.g., 360A), and an input/output bus for the cell set (e.g., 321IO). In some embodiments, the cells may be connected to the cell balance switches and resistors, which may be connected to the cell multiplexing switches.

In some embodiments, each cell (e.g., each of 321A-C) may be connected to an array of the cell multiplexing switches, which may connect or isolate the given cell(s) from the input/output bus (e.g., 321IO), and which may connect or disconnect the given cell(s) to a balance resistor (e.g., one of the resistors in 326A2) that shares the balance bus with the other cells. Additionally, in discharge mode one cell (e.g., 321A) may be connected to the input/output bus and disconnected from the balance resistor. The remaining cells (e.g., 321B-C) may be disconnected from the input/output bus and connected to the corresponding balance resistor(s). Additionally, in charge mode for some embodiments, all cells (e.g., 321A-C) may be connected to the input/output bus and disconnected from the balance resistors 326A2.

According to some embodiments, the cell block microcontroller (e.g., 327A) may generate switching waveforms to ensure that overlap and deadband requirements for the switching is appropriate for the application or load. Additionally, the cell block microcontroller may determine the state required by the application or load by monitoring the cell block's voltage and current, as well as by receiving communication from a battery management microcontroller (e.g., 327 in FIG. 3A), to which the cell block microcontroller may be connected via the battery management microcontroller interface.

Figure 3C:
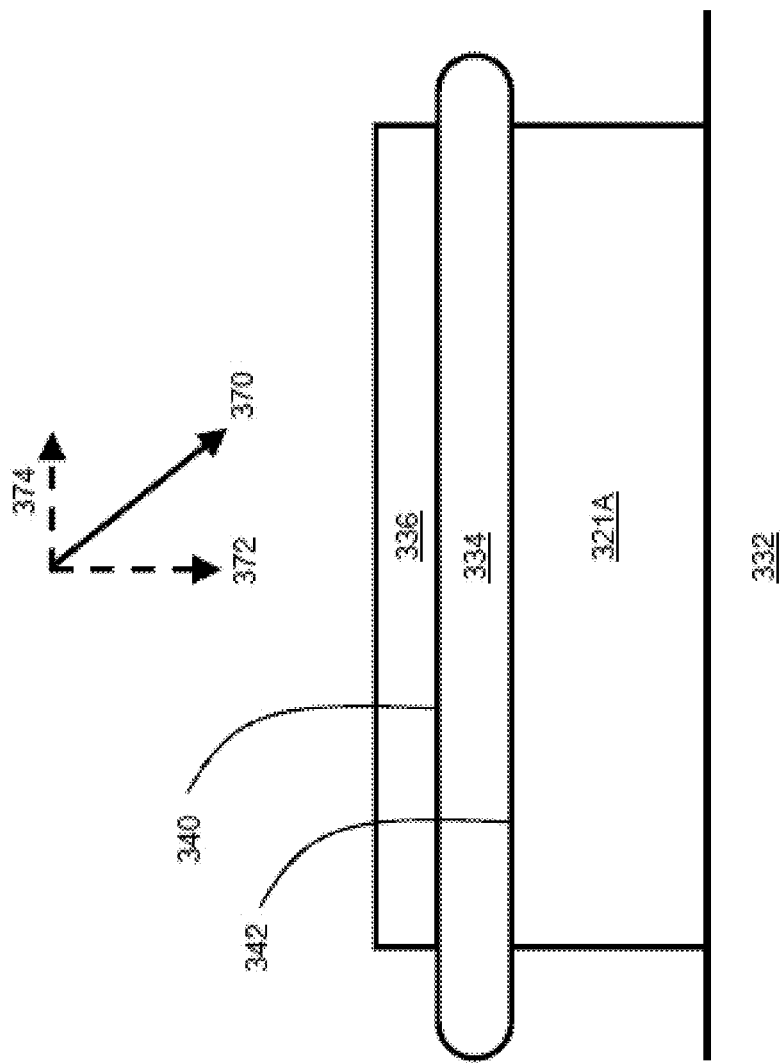
FIG. 3C is a cross-sectional schematic diagram illustrating the application of an anisotropic force to one or more electrochemical cells, according to some embodiments.

FIG. 3C is an exemplary cross-sectional schematic illustration of an electrochemical system in which an anisotropic force is applied to an electrochemical cell (e.g., 321A), according to one set of embodiments. The term "electrochemical cell" is used herein to generally refer to an anode, a cathode, and an electrolyte configured to participate in an electrochemical reaction to produce power. An electrochemical cell can be rechargeable or non-rechargeable.

In FIG. 3C, the system may include electrochemical cell 321A and, in some embodiments, a pressure distributor 334 containing a fluid associated with electrochemical cell 321A. Pressure distributor 334 can be configured such that an anisotropic force is applied to a component of electrochemical cell 321A through pressure distributor 334. For example, in the set of embodiments illustrated in FIG. 3C, pressure transmitter 336 can be configured to apply an anisotropic force to pressure distributor 334, which in turn causes an anisotropic force to be applied to at least one component (e.g., an electrode) of electrochemical cell 321A. The system can also include a substrate 332 on which the electrochemical cell is positioned. Substrate 332 can comprise, for example, a tabletop, a surface of a container in which electrochemical cell 321A is housed, or any other suitable surface.

Pressure distributor 334 can be associated with electrochemical cell 321A in a variety of suitable configurations to produce the inventive systems and methods described herein. As used herein, a pressure distributor is associated with an electrochemical cell when at least a portion of a force that is applied to and/or through the pressure distributor can be transmitted to a component of the electrochemical cell. For example, in certain embodiments, a pressure distributor is associated with an electrochemical cell when the pressure distributor is in direct contact with the electrochemical cell or a component thereof. Generally, a first article and a second article are in direct contact when the first article and the second article are directly touching. For example, in FIG. 3C, pressure distributor 334 and the electrochemical cell 321A are in direct contact.

In certain embodiments, a pressure distributor is associated with the electrochemical cell when the pressure distributor is in indirect contact with at least one component of the electrochemical cell. Generally, a first article and a second article are in indirect contact when a pathway can be traced between the first article and the second article that intersects only solid and/or liquid components. Such a pathway can be in the form of a substantially straight line, in certain embodiments. A pressure distributor can be in indirect contact with an electrochemical cell, in certain embodiments, when one or more solid and/or liquid materials are positioned between them, but a force can still be transmitted to the electrochemical cell through the pressure distributor.

In certain embodiments, a pressure distributor is associated with an electrochemical cell when it is located within the boundaries of a container at least partially (e.g., completely) enclosing the components of the electrochemical cell. For example, in certain embodiments, pressure distributor 334 could be positioned between an electrode and a container at least partially enclosing the electrochemical cell. In certain embodiments, pressure distributor 334 could be positioned between a current collector and a container at least partially enclosing the electrochemical cell. In some embodiments, pressure distributor 334 can be used as a current collector, for example, positioned next to an electrode of the electrochemical cell and within a container at least partially containing the electrodes and electrolyte of the electric cell. This could be achieved, for example, by fabricating pressure distributor 334 from a material (e.g., a metal such as a metal foil, a conductive polymer, and the like) that is sufficiently electrically conductive to transport electrons to and/or from an electrode of the electrochemical cell.

In some embodiments, a pressure distributor is associated with an electrochemical cell when it is located outside the boundaries of a container at least partially (e.g., completely) enclosing the components of the electrochemical cell. For example, in certain embodiments, pressure distributor 334 could be positioned in direct or indirect contact with an exterior surface of a container at least partially enclosing the electrodes and electrolyte of an electrochemical cell.

In certain embodiments, the pressure distributor can be located a relatively short distance from at least one electrode of an electrochemical cell. For example, in certain embodiments, the shortest distance between the pressure distributor and an electrode of the electrochemical cell is less than about 10 times, less than about 5 times, less than about 2 times, less than about 1 time, less than about 0.5 times, or less than about 0.25 times the maximum cross-sectional dimension of that electrode.

In some embodiments, a pressure distributor can be associated with a particular electrode (e.g., an anode) of an electrochemical cell. For example, a pressure distributor can be in direct or indirect contact with an electrode (e.g., an anode such as an anode comprising lithium) of an electrochemical cell. In certain embodiments, the pressure distributor can be positioned outside a container at least partially containing the electrode but still associated with the electrode, for example, when only liquid and/or solid components separate the electrode from the pressure distributor. For example, in certain embodiments in which the pressure distributor is positioned in direct or indirect contact with a container at least partially enclosing the electrode and a liquid electrolyte, the pressure distributor would be associated with the electrode.

In certain embodiments, a force can be applied to electrochemical cell 321A or a component of electrochemical cell 321A (e.g., an electrode of the electrochemical cell) through pressure distributor 334. As used herein, a force is applied to a first component (e.g., an electrochemical cell) through a second component (e.g., a pressure distributor) when the second component at least partially transmits a force from the source of the force to the first component.

A force can be applied to an electrochemical cell or a component thereof through a pressure distributor in a variety of ways. In certain embodiments, applying a force to a pressure distributor comprises applying a force to an external surface of the pressure distributor. This can be achieved, for example, via pressure transmitter 336. For example, in FIG. 3C, pressure transmitter 336 can be positioned to apply an anisotropic force to electrochemical cell 321A through pressure distributor 334 by applying a force to surface 340 of pressure distributor 334. As used herein, a first component is positioned to apply an anisotropic force to a second component when the first and second components are positioned such that at least a portion of a force that is applied to and/or through the first component can be transmitted to the second component. In certain embodiments, pressure transmitter and the pressure distributor are in direct contact. In some embodiments, one or more materials (e.g., one or more solid and/or liquid materials) are positioned between the pressure transmitter and the pressure distributor, but a force can still be applied to the pressure distributor by the pressure transmitter. In certain embodiments, the pressure transmitter and the pressure distributor can be in indirect contact such that a continuous pathway can be traced through solid and/or liquid materials from the pressure distributor to the electrochemical cell. Such a pathway can be substantially (e.g., completely) straight, in certain embodiments.

In the set of embodiments illustrated in FIG. 3C, pressure transmitter 336 and electrochemical cell 321A are positioned on opposite sides of pressure distributor 334. Accordingly, when an anisotropic force (e.g., an anisotropic force in the direction of arrow 150) is applied to and/or by pressure transmitter 336 to surface 340, the force can be transmitted through pressure distributor 334 onto surface 342 of electrochemical cell 321A, and to the components of electrochemical cell 321A.

In some embodiments, applying a force to a pressure distributor comprises applying a force to an internal surface of the pressure distributor. For example, in certain embodiments, a force can be applied through the pressure distributor to the electrochemical cell by maintaining and/or increasing the pressure of the fluid within the pressure distributor. In the set of embodiments illustrated in FIG. 3C, a force can be applied through pressure distributor 334 to electrochemical cell 321A by transporting additional fluid through an inlet (not shown) of pressure distributor 334 (e.g., by inflating pressure distributor 334). In some such embodiments, when the pressure within a pressure distributor is maintained and/or increased, the movement of pressure transmitter can be restricted such that a force is produced on an external surface of the electrochemical cell and/or on a component of the electrochemical cell (e.g., an active surface of an electrode within the electrochemical cell). For example, in FIG. 3C, as additional fluid is added to pressure distributor 334, pressure transmitter 336 can be configured to restrict the movement of the boundaries of pressure distributor 334 such that a force is applied to surface 342 of electrochemical cell 321A.

In certain embodiments, fluid can be added to pressure distributor 334 before it is positioned between electrochemical cell 321A and pressure transmitter 336. After the fluid has been added, pressure distributor 334 can be compressed and positioned between electrochemical cell 321A and pressure transmitter 336, after which, the compression of the fluid within pressure distributor 334 can produce a force that is applied to surface 342 of electrochemical cell 321A (and, accordingly, to a surface of one or more components of the electrochemical cell, such as an active surface of an electrode). One of ordinary skill in the art, given the present disclosure, would be capable of designing additional systems and methods by which a force can be applied to an electrochemical cell through a pressure distributor.

The fluid within pressure distributor 334 can allow the pressure that is transmitted through pressure distributor 334 to be applied relatively evenly across the surface 342 of electrochemical cell 321A (and, accordingly, relatively evenly across a surface of one or more components of the electrochemical cell, such as an active surface of an electrode). Not wishing to be bound by any particular theory, it is believed that a presence of a fluid within pressure distributor 334 reduces and/or eliminates points of relatively high pressure on surface 342 as fluid within relatively high pressure regions is transported to regions of relatively low pressure.

In some embodiments, the degree to which the pressure distributor evenly distributes the force applied to electrochemical cell can be enhanced if the external surface of the pressure transmitter is appropriately aligned with an external surface of the electrochemical cell or a container thereof. For example, in the set of embodiments illustrated in FIG. 3C, external surface 340 of pressure transmitter 336 faces external surface 342 of electrochemical cell 321A. In certain embodiments, the external surface of the pressure transmitter is substantially parallel to the external surface of the electrochemical cell to which a force is applied. For example, in the set of embodiments illustrated in FIG. 3C, external surface 340 of pressure transmitter 336 is substantially parallel to external surface 342 of electrochemical cell 321A. As used herein, two surfaces are substantially parallel to each other when the two surfaces form angles of no greater than about 10 degrees. In certain embodiments, two substantially parallel surfaces form angles of no greater than about 5 degrees, no greater than about 3 degrees, no greater than about 1 degree, or no greater than about 0.1 degree.

The pressure distributor can have a variety of suitable forms. In certain embodiments, the pressure distributor can comprise a bag or other suitable container in which a fluid is contained. In some embodiments, the pressure distributor can comprise a bellows that is configured to deform along the direction in which the force is applied to the pressure distributor.

The pressure distributor container can be made of a variety of materials. In certain embodiments, the pressure distributor container can comprise a flexible material. For example, in certain embodiments, the pressure distributor container can comprise a polymer such as polyethylene (e.g., linear low density and/or ultra-low density polyethylene), polypropylene, polyvinylchloride, polyvinyldichloride, polyvinylidene chloride, ethylene vinyl acetate, polycarbonate, polymethacrylate, polyvinyl alcohol, nylon, silicone rubber (e.g., polydimethylsiloxane), and/or other natural or synthetic rubbers or plastics. In certain embodiments (e.g., in embodiments in which a gas is used as the fluid within the pressure distributor), the pressure distributor container can include a metal layer (e.g., an aluminum metal layer), which can enhance the degree to which fluid (e.g., a gas) is retained within the pressure distributor. The use of flexible materials can be advantageous, in certain embodiments, as they may allow for redistribution of the contents of the pressure distributor relatively easily, enhancing the degree to which the force is uniformly applied.

In some embodiments, the pressure distributor can comprise an elastic material. In certain embodiments, the elasticity of the material from which the pressure distributor is fabricated can be selected such that the pressure distributor transmits a desirable amount of a force applied to the pressure distributor to an adjacent component. To illustrate, in certain cases, if the pressure distributor is made of a very flexible material, a relatively high percentage of the force applied to the pressure distributor might be used to elastically deform the pressure distributor material, rather than being transmitted to an adjacent electrochemical cell. In certain embodiments, the pressure distributor can be formed of a material having a Young's modulus of less than about 1 GPa. One of ordinary skill in the art would be capable of measuring the Young's modulus of a given material by performing, for example, a tensile test (also sometimes referred to a tension test). Exemplary elastic polymers (i.e., elastomers) that could be used include the general classes of silicone polymers, epoxy polymers, and acrylate polymers.

In certain embodiments, the pressure distributor comprises an enclosed container containing a fluid. The pressure distributor can comprise an open container containing a fluid, in certain embodiments. For example, in some embodiments, the pressure distributor comprises a container fluidically connected to a device constructed and arranged to transport the fluid through the pressure distributor, as described in more detail below.

A variety of fluids can be used in association with the pressure distributor. As used herein, a "fluid" generally refers to a substance that tends to flow and to conform to the outline of its container. Examples of fluids include liquids, gases, gels, viscoelastic fluids, solutions, suspensions, fluidized particulates, and the like. Typically, fluids are materials that are unable to withstand a static shear stress, and when a shear stress is applied, the fluid experiences a continuing and permanent distortion. The fluid may have any suitable viscosity that permits flow and redistribution of an applied force.

In certain embodiments, the fluid within the pressure distributor comprises a gas (e.g., air, nitrogen, a noble gas (e.g., helium, neon, argon, krypton, xenon), a gas refrigerant, or mixtures of these). In certain embodiments, the gas within the pressure distributor can comprise a relatively high molecular weight (e.g., at least about 100 g/mol), which can limit the degree to which gas permeates through the walls of the pressure distributor. In some embodiments, the fluid within the pressure distributor comprises a liquid including, but not limited to, water, an electrolyte (e.g., a liquid electrolyte similar or identical to that used in the electrochemical cell), greases (e.g., petroleum jelly, Teflon grease, silicone grease), oils (e.g., mineral oil), and the like. In certain embodiments, the fluid within the pressure distributor comprises a gel. Suitable gels for use within the pressure distributor include, but are not limited to, hydrogels (e.g., silicone gel), organogels, or xerogels. In certain embodiments, the fluid comprises a fluidized bed of solid particles (e.g., sand, powders, and the like). Fluidization can be achieved, for example, by passing a gas and/or a liquid through the particles and/or by vibrating a substrate on which the particles are positioned such that the particles move relative to each other.

The fluid used in association with the pressure distributor can have any suitable viscosity. In certain embodiments, a Newtonian fluid can be used within the pressure distributor, although the invention is not so limited, and non-Newtonian fluids (e.g., a shear thinning fluid, a shear thickening fluid, etc.) can also be used. In certain embodiments, the pressure distributor can contain a Newtonian fluid with a steady-state shear viscosity of less than about $1 \times 10^7$ centipoise (cP), less than about $1 \times 10^6$ cP, less than about $1 \times 10^5$ cP less than about 1000 cP, less than about 100 cP, less than about 10 cP, or less than about 1 cP (and, in some embodiments, greater than about 0.001 cP, greater than about 0.01 cP, or greater than about 0.1 cP) at room temperature.

In certain embodiments, the fluid within the pressure distributor can be selected such that it is suitable for being transported into and/or out of the pressure distributor. For example, in certain embodiments, fluid may be transported into the pressure distributor to apply an anisotropic force to the electrochemical cell (e.g., by compressing the fluid within the pressure distributor when it is positioned between the electrochemical cell and the pressure transmitter). As another example, a fluid may be transported into and/or out of a pressure distributor to transfer heat to and/or away from a component of the system.

Pressure transmitter 336 can also adopt a variety of configurations. In certain embodiments, pressure transmitter 336 is moveable relative to electrochemical cell 321A. In some such embodiments, a force can be applied to electrochemical cell 321A through pressure distributor 334 by moving pressure transmitter 336 closer to electrochemical cell 321A and/or maintaining the separation between electrochemical cell 321A and pressure transmitter 336. As one particular example, in some embodiments the pressure transmitter 336 includes a compression spring, a first applicator structure, and a second applicator structure. First applicator structure can correspond to, for example, a flat plate of rigid material, or any other suitable structure. Second applicator structure can correspond to, for example, a second plate of rigid material, a portion of a wall of a container in which the electrochemical cell is housed, or any other suitable structure. In some embodiments, a force can be applied to surface 342 of electrochemical cell 321A when a compression spring is compressed between applicator structure and applicator structure. In certain embodiments, Belleville washers, machine screws, pneumatic devices, weights, air cylinders, and/or hydraulic cylinders could be used in place of, or in addition to, the compression spring. In some embodiments, a force can be applied to an electrochemical cell using a constricting element (e.g., an elastic band, a turnbuckle band, etc.) arranged around one or more external surfaces of the electrochemical cell. A variety of suitable methods for applying a force to an electrochemical cell are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

In certain embodiments, pressure transmitter 336 is not substantially moveable relative to electrochemical cell 321A, and a force can be applied to the electrochemical cell, for example, by pressurizing the pressure distributor 334. In some such embodiments, pressurizing the pressure distributor can result in the application of a force to the electrochemical cell because the substantially immovable pressure transmitter 336 restricts the movement of one or more of the boundaries of pressure distributor 334, thereby applying an anisotropic force to electrochemical cell 321A.

In certain embodiments, pressure transmitter comprises all or part of a substantially rigid structure (e.g., a package enclosing an electrochemical cell), and the movement of the pressure transmitter can be restricted by the degree to which the substantially rigid structure is inflexible. In certain embodiments, the pressure transmitter can comprise a structure that is integrated with at least a portion of the other components of the system, which can restrict its movement. For example, in certain embodiments, the pressure transmitter can comprise at least a portion of one or more walls of a package within which electrochemical cell 321A and pressure distributor 334 are positioned. As one particular example, pressure transmitter 336 might form a first wall of a package containing electrochemical cell 321A while substrate 332 forms a second wall (e.g., opposite to the first wall) of the package. In certain embodiments, the movement of pressure transmitter 336 can be restricted by applying a force within and/or on the pressure transmitter such that its movement is restricted. In any of these cases, a force can be applied to the electrochemical cell, in certain embodiments, by adding fluid to and/or maintaining the amount of fluid within pressure distributor 334.

FIG. 3C illustrates a set of embodiments in which a single pressure transmitter and a single pressure distributor are used to apply a force to an electrochemical cell. In certain embodiments, however, more than one pressure distributor and/or more than one pressure transmitter can be employed. For example, in some embodiments, the system includes a second pressure distributor positioned under electrochemical cell 321A and a second pressure transmitter positioned under the second pressure distributor. In certain embodiments, a substantially evenly distributed force can be applied to an external surface of electrochemical cell 321A through the second pressure distributor, for example, by applying a force to and/or through the second pressure transmitter and onto a surface of the second pressure distributor.

In some embodiments, fluid can be transported into and/or out of the pressure distributor to transport heat to and/or away from electrochemical cell 321A. For example, pressure distributor 334 may include an inlet and an outlet configured to transport a fluid through pressure distributor 334. As fluid is transported through pressure distributor 334, it can absorb heat from electrochemical cell 321A and transport it away from the system via the outlet. Any suitable device can be used to transport the fluid through the pressure distributor such as, for example, a pump, a vacuum, or any other suitable device.

In certain embodiments, the fluid used in association with the pressure distributor can be selected such that it cools or heats the system to a desired degree. For example, in certain embodiments, the fluid within the pressure distributor can comprise a coolant such as water, ethylene glycol, diethylene glycol, propylene glycol, polyalkylene glycols (PAGs), oils (e.g., mineral oils, castor oil, silicone oils, fluorocarbon oils, and/or refrigerants (e.g., freons, chlorofluorocarbons, perfluorocarbons, and the like).

The embodiments described herein can be used with a variety of electrochemical cells. While primary (disposable) electrochemical cells and secondary (rechargeable) electrochemical cells can be used in association with the embodiments described herein, some embodiments advantageously make use of secondary electrochemical cells, for example, due to the benefits provided by uniform force application during the (re)charging process. In certain embodiments, the electrochemical cell comprises a lithium-based electrochemical cell such as a lithium-sulfur electrochemical cell (and assemblies of multiple cells, such as batteries thereof).

Figure 3D:
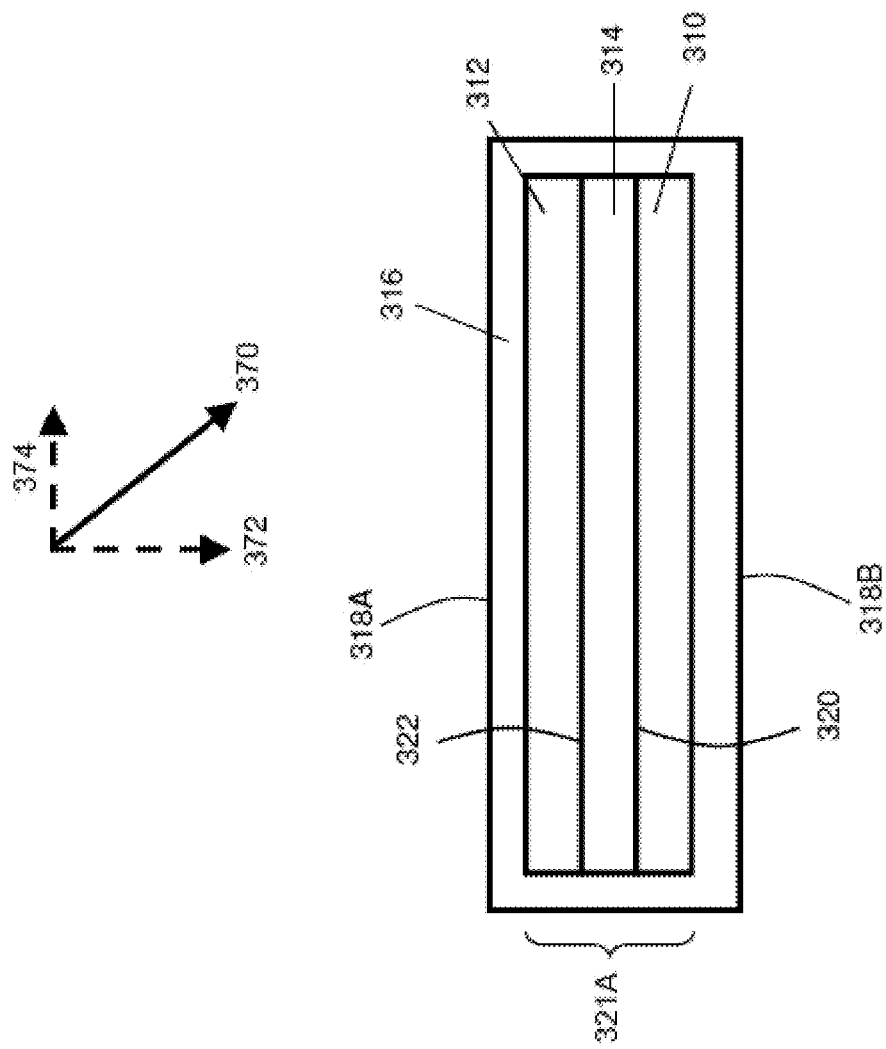
FIG. 3D is a cross-sectional schematic diagram of electrochemical cells, according to some embodiments.

Although the present invention can find use in a wide variety of electrochemical devices, an example of one such device is provided in FIG. 3D for illustrative purposes only. In FIG. 3D, a general embodiment of electrochemical cell 321A includes cathode 310, anode 312, and electrolyte 314 in electrochemical communication with the cathode and the anode.

In some cases, electrochemical cell 321A may optionally be at least partially contained by containment structure 316. Containment structure 316 may comprise a variety of shapes including, but not limited to, cylinders, prisms (e.g., triangular prisms, rectangular prisms, etc.), cubes, or any other shape. In certain embodiments, a pressure distributor can be associated with electrochemical cell 321A by positioning the pressure distributor outside containment structure 316, in either direct or indirect contact with surface 318A and/or surface 318B. When positioned in this way, the pressure distributor can be configured to apply a force, directly or indirectly, to surfaces 318A and/or 318B of containment structure 316, as described above. In certain embodiments, a pressure distributor can be positioned between cathode 310 and containment structure 316, or between anode 312 and containment structure 316. In some such embodiments, containment structure can act as a pressure transmitter and/or a separate pressure transmitter can be configured to apply a force to the pressure distributor via the containment structure.

A typical electrochemical cell system also would include, of course, current collectors, external circuitry, and the like. Those of ordinary skill in the art are well aware of the many arrangements that can be utilized with the general schematic arrangement as shown in the figures and described herein.

The components of electrochemical cell 321A may be assembled, in some cases, such that the electrolyte is located between the cathode and the anode in a planar configuration. For example, in the embodiments illustrated in FIG. 3D, cathode 310 of electrochemical cell 321A is substantially planar. A substantially planar cathode can be formed, for example, by coating a cathode slurry on a planar substrate, such as a metal foil or other suitable substrate, which may be included in the assembly of electrochemical cell 321A (although not illustrated in FIG. 3D) or removed from cathode 310 prior to assembly of the electrochemical cell. In addition, in FIG. 3D, anode 312 is illustrated as being substantially planar. A substantially planar anode can be formed, for example, by forming a sheet of metallic lithium, by forming an anode slurry on a planar substrate, or by any other suitable method. Electrolyte 314 is also illustrated as being substantially planar in FIG. 3D.

In certain embodiments, electrochemical cell 321A can comprise an electrode that comprises a metal such as an elemental metal and/or a metal alloy. As one particular example, in certain embodiments, electrochemical cell 321A can comprise an anode comprising elemental lithium (e.g., elemental lithium metal and/or a lithium alloy). In certain embodiments, the anisotropic force applied to the electrochemical cell is sufficiently large such that the application of the force affects the surface morphology of the metal within an electrode of the electrochemical cell, as described in more detail below.

While FIG. 3D illustrates an electrochemical cell arranged in a planar configuration, it is to be understood that any electrochemical cell arrangement can be constructed, employing the principles of the present invention, in any configuration. In addition to the shape illustrated in FIG. 3D, the electrochemical cells described herein may be of any other shape including, but not limited to, cylinders, a folded multi-layer structure, prisms (e.g., triangular prisms, rectangular prisms, etc.), "Swiss-rolls," non-planar multi-layered structures, etc. Additional configurations are described in U.S. patent application Ser. No. 11/400,025, filed Apr. 6, 2006, entitled, "Electrode Protection in both Aqueous and Non-Aqueous Electrochemical Cells, including Rechargeable Lithium Batteries," to Affinito et al., which is incorporated herein by reference in its entirety.

In some embodiments, the cathode and/or the anode comprise at least one active surface. As used herein, the term "active surface" is used to describe a surface of an electrode that is in physical contact with the electrolyte and at which electrochemical reactions may take place. For example, in the set of embodiments illustrated in FIG. 3D, cathode 310 includes cathode active surface 320 and anode 312 includes anode active surface 322.

In certain embodiments, the anisotropic force applied to a pressure transmitter 336 and/or through pressure distributor 334 (and eventually in some cases to surface 342 of electrochemical cell 321A) comprises a component normal to the active surface of an electrode (e.g., an anode such as an anode containing lithium metal) within the electrochemical cell. Accordingly, applying an anisotropic force through pressure distributor 334 to the electrochemical cell can result in an anisotropic force being applied to an active surface of an electrode (e.g., an anode) within the electrochemical cell. In the case of a planar electrode surface, the applied force may comprise an anisotropic force with a component normal to the electrode active surface at the point at which the force is applied. For example, referring to the set of embodiments illustrated in FIG. 3C and FIG. 3D, an anisotropic force in the direction of arrow 370 may be applied to electrochemical cell 321A through pressure distributor 334. An anisotropic force applied in the direction of arrow 370 would include a component 372 that is normal to anode active surface 322 and normal to cathode active surface 320. In addition, an anisotropic force applied in the direction of arrow 370 would include a component 374 that is not normal (and is in fact parallel) to anode active surface 322 and cathode active surface 320.

In the case of a curved surface (e.g., a concave surface or a convex surface), the force applied to the electrochemical cell may comprise an anisotropic force with a component normal to a plane that is tangent to the curved surface at the point at which the force is applied.

In one set of embodiments, systems and methods of the invention are configured such that, during at least one period of time during charge and/or discharge of the cell, an anisotropic force with a component normal to the active surface of an electrode (e.g., the anode) is applied to the electrochemical cell. In some embodiments, the force may be applied continuously, over one period of time, or over multiple periods of time that may vary in duration and/or frequency.

The magnitude of the applied force is, in some embodiments, large enough to enhance the performance of the electrochemical cell. In certain embodiments, an electrode active surface (e.g., an anode active surface) and the anisotropic force may be together selected such that the anisotropic force affects surface morphology of the electrode active surface to inhibit an increase in electrode active surface area through charge and discharge and wherein, in the absence of the anisotropic force but under otherwise essentially identical conditions, the electrode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject electrochemical cell.

The electrode active surface and anisotropic force can be selected together, to achieve results described herein, easily by those of ordinary skill in the art. For example, where the electrode active surface is relatively soft, the component of the force normal to the electrode active surface may be selected to be lower. Where the electrode active surface is harder, the component of the force normal to the electrode active surface may be greater. Those of ordinary skill in the art, given the present disclosure, can easily select anode materials, alloys, mixtures, etc. with known or predictable properties, or readily test the hardness or softness of such surfaces, and readily select cell construction techniques and arrangements to provide appropriate forces to achieve what is described herein. Simple testing can be done, for example by arranging a series of active materials, each with a series of forces applied normal (or with a component normal) to the active surface, to determine the morphological effect of the force on the surface without cell cycling (for prediction of the selected combination during cell cycling) or with cell cycling with observation of a result relevant to the selection.

As noted above, in some embodiments, an anisotropic force with a component normal to an electrode active surface (e.g., of the anode) is applied, during at least one period of time during charge and/or discharge of the cell, to an extent effective to inhibit an increase in surface area of the electrode active surface relative to an increase in surface area absent the anisotropic force. The component of the anisotropic force normal to the electrode active surface may, for example, define a pressure of at least about 20, at least about 25, at least about 35, at least about 40, at least about 50, at least about 75, at least about 90, at least about 100, at least about 125, at least about 150, at least about 200, at least about 300, at least about 400, or at least about 500 Newtons per square centimeter. In certain embodiments, the component of the anisotropic force normal to the anode active surface may, for example, define a pressure of less than about 500, less than about 400, less than about 300, less than about 200, less than about 190, less than about 175, less than about 150, less than about 125, less than about 115, or less than about 110 Newtons per square centimeter. While forces and pressures are generally described herein in units of Newtons and Newtons per unit area, respectively, forces and pressures can also be expressed in units of kilograms-force and kilograms-force per unit area, respectively. One of ordinary skill in the art will be familiar with kilogram-force-based units, and will understand that 1 kilogram-force is equivalent to about 9.8 Newtons.

In certain embodiments, the component of the anisotropic force normal to the active surface of an electrode within the electrochemical cell defines a pressure that is at least about 50%, at least about 75%, at least about 100%, at least about 120% of the yield stress of that electrode (e.g., during charge and/or discharge of the electrochemical cell). In certain embodiments, the component of the anisotropic force normal to the active surface of an electrode within the electrochemical cell defines a pressure that is less than about 250% or less than about 200% of the yield stress of that electrode (e.g., during charge and/or discharge of the electrochemical cell). For example, in some embodiments, the electrochemical cell can comprise an anode (e.g., an anode comprising lithium metal and/or a lithium alloy), and the component of an applied anisotropic force that is normal to the anode active surface can define a pressure that is at least about 50%, at least about 75%, at least about 100%, or at least about 120% of the yield stress of the anode (and/or less than about 250% or less than about 200% of the yield stress of the anode). In some embodiments, the electrochemical cell can comprise a cathode, and the component of the anisotropic force normal to the cathode active surface can define a pressure that is at least about 50%, at least about 75%, at least about 100%, or at least about 120% of the yield stress of the cathode (and/or less than about 250% or less than about 200% of the yield stress of the cathode).

In some cases, the anisotropic force can define a pressure that is relatively uniform across one or more external surfaces of the electrochemical cell and/or across one or more active surfaces of electrode(s) within the electrochemical cell. In some embodiments, at least about 50%, at least about 75%, at least about 85%, at least about 90%, at least about 95%, or at least about 98% of the area of one or more external surfaces of an electrochemical cell and/or of the area of one or more active surfaces of an electrode (e.g., anode) defines a uniform area that includes a substantially uniform distribution of pressure defined by an anisotropic force. In this context, a "surface of an electrochemical cell" and a "surface of an electrode" refer to the geometric surfaces of the electrochemical cell and the electrode, which will be understood by those of ordinary skill in the art to refer to the surfaces defining the outer boundaries of the electrochemical cell and electrode, for example, the area that may be measured by a macroscopic measuring tool (e.g., a ruler) and does not include the internal surface area (e.g., area within pores of a porous material such as a foam, or surface area of those fibers of a mesh that are contained within the mesh and do not define the outer boundary, etc.).

In some embodiments, a pressure is substantially uniformly distributed across a surface when any continuous area that covers about 10%, about 5%, about 2%, or about 1% of the uniform area (described in the preceding paragraph) includes an average pressure that varies by less than about 25%, less than about 10%, less than about 5%, less than about 2%, or less than about 1% relative to the average pressure across the entirety of the uniform area.

Stated another way, in some embodiments, at least about 50% (or at least about 75%, at least about 85%, at least about 90%, at least about 95%, or at least about 98%) of the area of a surface of the electrochemical cell and/or of the active area of an electrode defines a first, continuous area of essentially uniform applied pressure, the first area having a first average applied pressure. In some cases, any continuous area that covers about 10% (or about 5%, about 2%, or about 1%) of the first, continuous area of the surface of the electrochemical cell and/or of the electrode includes a second average applied pressure that varies by less than about 25% (or less than about 10%, less than about 5%, less than about 2%, or less than about 1%) relative to the first average applied pressure across the first, continuous area.

One of ordinary skill in the art would be capable of determining an average applied pressure within a portion of a surface, for example, by determining the force level applied at a representative number of points within the surface portion, integrating a 3-dimensional plot of the applied pressure as a function of position on the surface portion, and dividing the integral by the surface area of the surface portion. One of ordinary skill in the art would be capable of producing a plot of the applied pressure across a surface portion by, for example, using a Tekscan I-Scan system for measuring the pressure field.

The anodes of the electrochemical cells described herein may comprise a variety of anode active materials. As used herein, the term "anode active material" refers to any electrochemically active species associated with the anode. For example, the anode may comprise a lithium-containing material, wherein lithium is the anode active material. Suitable electroactive materials for use as anode active materials in the anode of the electrochemical cells described herein include, but are not limited to, lithium metal such as lithium foil and lithium deposited onto a conductive substrate, and lithium alloys (e.g., lithium-aluminum alloys and lithium-tin alloys). Methods for depositing a negative electrode material (e.g., an alkali metal anode such as lithium) onto a substrate may include methods such as thermal evaporation, sputtering, jet vapor deposition, and laser ablation. Alternatively, where the anode comprises a lithium foil, or a lithium foil and a substrate, these can be laminated together by a lamination process as known in the art to form an anode.

In one embodiment, an electroactive lithium-containing material of an anode active layer comprises greater than 50% by weight of lithium. In another embodiment, the electroactive lithium-containing material of an anode active layer comprises greater than 75% by weight of lithium. In yet another embodiment, the electroactive lithium-containing material of an anode active layer comprises greater than 90% by weight of lithium. Additional materials and arrangements suitable for use in the anode are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

The cathodes in the electrochemical cells described herein may comprise a variety of cathode active materials. As used herein, the term "cathode active material" refers to any electrochemically active species associated with the cathode. Suitable electroactive materials for use as cathode active materials in the cathode of the electrochemical cells of the invention include, but are not limited to, one or more metal oxides, one or more intercalation materials, electroactive transition metal chalcogenides, electroactive conductive polymers, sulfur, carbon and/or combinations thereof.

In some embodiments, the cathode active material comprises one or more metal oxides. In some embodiments, an intercalation cathode (e.g., a lithium-intercalation cathode) may be used. Non-limiting examples of suitable materials that may intercalate ions of an electroactive material (e.g., alkaline metal ions) include metal oxides, titanium sulfide, and iron sulfide. In some embodiments, the cathode is an intercalation cathode comprising a lithium transition metal oxide or a lithium transition metal phosphate. Additional examples include $Li_xCoO_2$ (e.g., $Li_{1.1}CoO_2$), $Li_xNiO_2$, $Li_xMnO_2$, $Li_xMn_2O_4$ (e.g., $Li_{1.05}Mn_2O_4$), $Li_xCoPO_4$, $Li_xMnPO_4$, $LiCo_xNi_{(1-x)}O_2$, and $LiCo_xNi_yMn_{(1-x-y)}O_2$ (e.g., $LiNi_{1/3}Mn_{1/3}Co_{1/3}O_2$, $LiNi_{3/5}Mn_{1/5}Co_{1/5}O_2$, $LiNi_{4/5}Mn_{1/10}Co_{1/10}O_2$, $LiNi_{1/2}Mn_{3/10}Co_{1/5}O_2$). X may be greater than or equal to 0 and less than or equal to 2. X is typically greater than or equal to 1 and less than or equal to 2 when the electrochemical cell is fully discharged, and less than 1 when the electrochemical cell is fully charged. In some embodiments, a fully charged electrochemical cell may have a value of x that is greater than or equal to 1 and less than or equal to 1.05, greater than or equal to 1 and less than or equal to 1.1, or greater than or equal to 1 and less than or equal to 1.2. Further examples include $Li_xNiPO_4$, where ($0<x\leq 1$), $LiMn_xNi_yO_4$ where ($x+y=2$) (e.g., $LiMn_{1.5}Ni_{0.5}O_4$), $LiNi_xCo_yAl_zO_2$ where ($x+y+z=1$), $LiFePO_4$, and combinations thereof. In some embodiments, the electroactive material within the cathode comprises lithium transition metal phosphates (e.g., $LiFePO_4$), which can, in certain embodiments, be substituted with borates and/or silicates.

As noted above, in some embodiments, the cathode active material comprises one or more chalcogenides. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In some embodiments, an electroactive sulfur-containing material of a cathode active layer comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The cathode active layers of the present invention may comprise from about 20 to 100% by weight of electroactive cathode materials (e.g., as measured after an appropriate amount of solvent has been removed from the cathode active layer and/or after the layer has been appropriately cured). In one embodiment, the amount of electroactive sulfur-containing material in the cathode active layer is in the range of 5-30% by weight of the cathode active layer. In another embodiment, the amount of electroactive sulfur-containing material in the cathode active layer is in the range of 20% to 90% by weight of the cathode active layer.

Additional materials suitable for use in the cathode, and suitable methods for making the cathodes, are described, for example, in U.S. Pat. No. 5,919,587, filed May 21, 1997, entitled "Novel Composite Cathodes, Electrochemical Cells Comprising Novel Composite Cathodes, and Processes for Fabricating Same," and U.S. Patent Publication No. 2010/0035128 to Scordilis-Kelley et al. filed on Aug. 4, 2009, entitled "Application of Force in Electrochemical Cells," each of which is incorporated herein by reference in its entirety for all purposes.

A variety of electrolytes can be used in association with the electrochemical cells described herein. In some embodiments, the electrolyte may comprise a non-solid electrolyte, which may or may not be incorporated with a porous separator. As used herein, the term "non-solid" is used to refer to materials that are unable to withstand a static shear stress, and when a shear stress is applied, the non-solid experiences a continuing and permanent distortion. Examples of non-solids include, for example, liquids, deformable gels, and the like.

The electrolytes used in electrochemical cells described herein can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. Exemplary materials suitable for use in the electrolyte are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

U.S. Provisional Application No. 62/712,761, filed Jul. 31, 2018, and entitled "Multiplexed Charge Discharge Battery Management System" is incorporated herein by reference in its entirety for all purposes.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U. S. Pub. No. 2007-0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/000090, filed Jan. 8, 2009, published as International Pub. No. WO/2009089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12/471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. Provisional Patent Apl. Ser. No. 61/376,554, filed on Aug. 24, 2010, entitled "Electrically Non-Conductive Materials for Electrochemical Cells;" U.S. Provisional patent application Ser. No. 12/862,528, filed on Aug. 24, 2010, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur" [51583.70029US00]; U.S. patent application Ser. No. 12/862,551, filed on Aug. 24, 2010, published as U.S. Pub. No. 2011/0070491, entitled "Electrochemical Cells Comprising Porous Structures Comprising Sulfur" [51583.70030US00]; U.S. patent application Ser. No. 12/862,576, filed on Aug. 24, 2010, published as U.S. Pub. No. 2011/0059361, entitled "Electrochemical Cells Comprising Porous Structures Comprising Sulfur" [51583.70031US00]; U.S. patent application Ser. No. 12/862,581, filed on Aug. 24, 2010, published as U.S. Pub. No. 2011/0076560, entitled "Electrochemical Cells Comprising Porous Structures Comprising Sulfur" [51583.70024US01]; U.S. Patent Apl. Ser. No. 61/385,343, filed on Sep. 22, 2010, entitled "Low Electrolyte Electrochemical Cells" [51583.70033US00]; and U.S. patent application Ser. No. 13/033,419, filed Feb. 23, 2011, entitled "Porous Structures for Energy Storage Devices" [51583.70034US00]. All other patents and patent applications disclosed herein are also incorporated by reference in their entirety for all purposes.

Figure 4A:
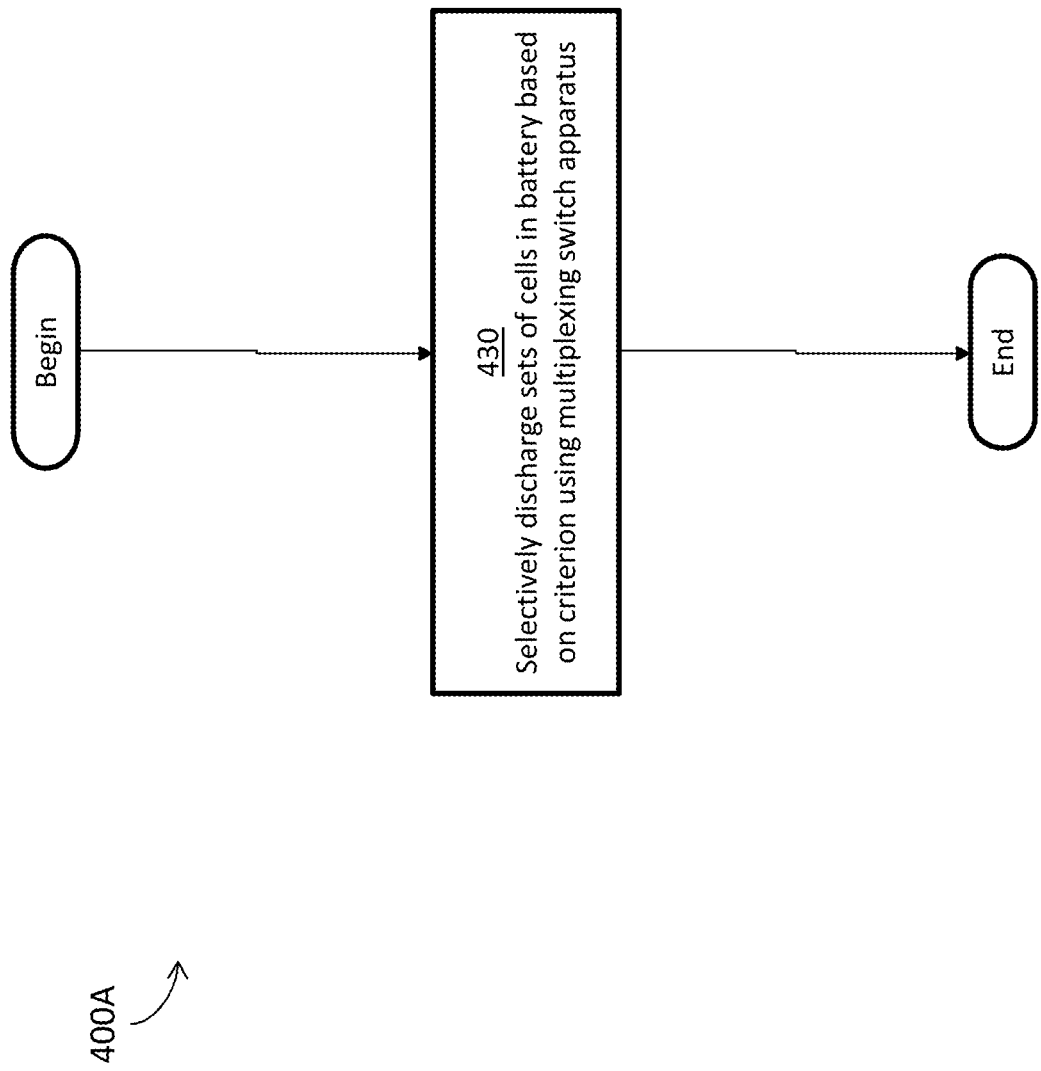
FIG. 4A is a flow chart depicting a representative process for discharging sets of cells of a battery, according to some embodiments.

FIG. 4A depicts a representative high-level process 400A for discharging sets of cells of a battery. The acts comprising representative process 400A are described in detail in the paragraphs that follow.

In some embodiments, representative process 400A may include act 430, wherein sets of cells in a battery may be selectively discharged based on at least one criterion using a multiplexing switch apparatus (such as multiplexing switch apparatus 112 described above). Additionally, the multiplexing switch apparatus may be connected to two or more sets (e.g., 121, 122, 123, and/or 124) of cells (e.g., 121A-C) of at least one battery (e.g., 120-150). Each set of cells may comprise one or more cells.

In some embodiments, process 400A may then end or repeat as necessary.

Figure 4B:
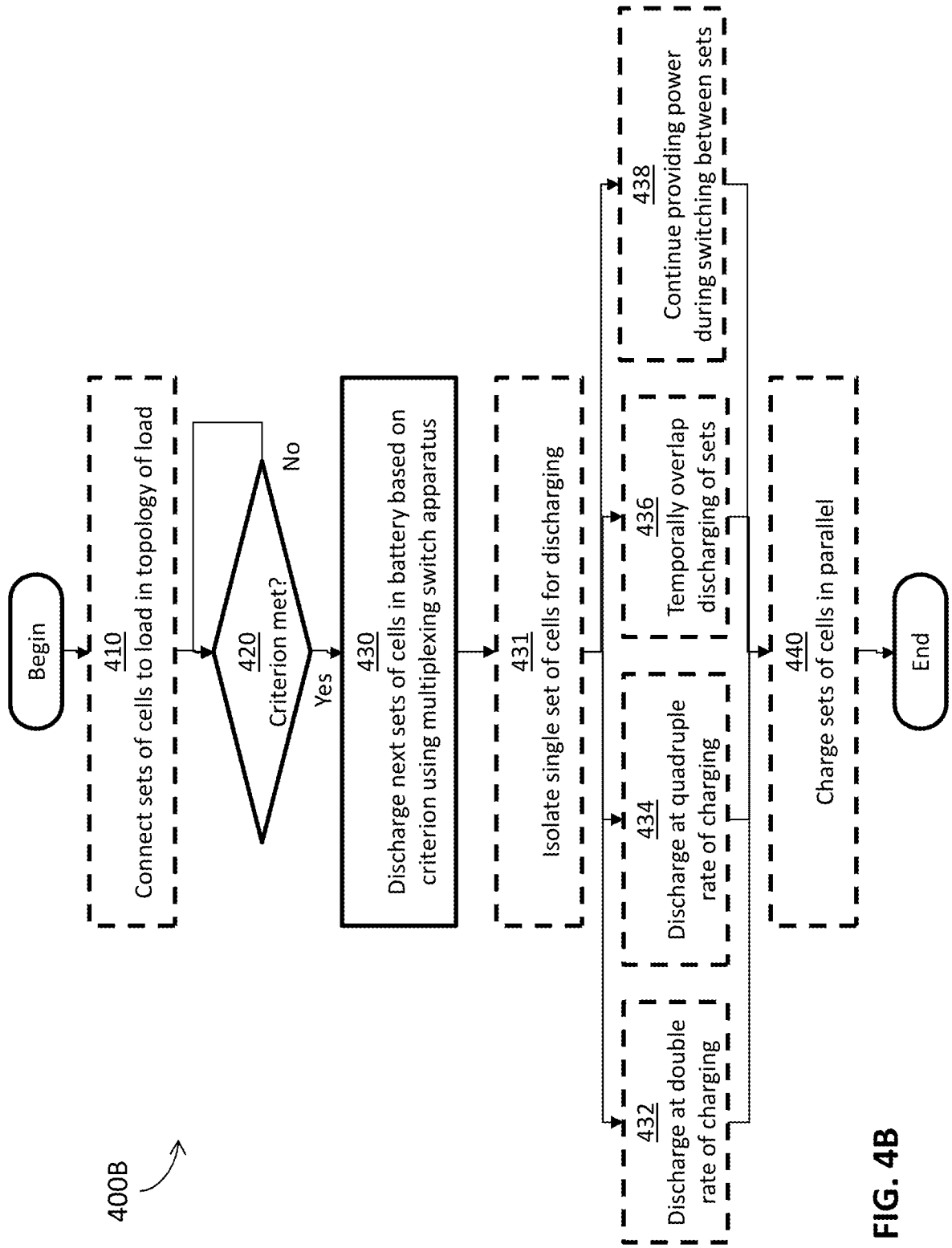
FIG. 4B is a flow chart depicting an additional representative process for discharging sets of cells of a battery, according to some embodiments.

FIG. 4B depicts a representative high-level process 400B for discharging sets of cells of a battery. The acts comprising representative process 400B are described in detail in the paragraphs that follow.

In some embodiments, representative process 400B optionally may begin at act 410, wherein the multiplexing switch apparatus may be used to connect the sets of cells to a load in a topology employed by the load. The batteries (e.g., 120-150) may include sets (e.g., 121, 122, 123, and/or 124) of the cells (e.g., 121A-C), and each set of cells may comprise one or more cells. For example, the multiplexing switch apparatus may connect the cells to the load in series, parallel, serial/parallel, or any other suitable topology required to meet the voltage and current requirements of the load or the desires of the given application or user.

In some embodiments, representative process 400B may then optionally proceed to act 420, wherein at least one criterion, and/or some parameter of a criterion, may be measured or otherwise monitored in relation to the cells of the battery or batteries, which may already be discharging or have discharged at least one cell or set of cells, to determine whether the criterion has been met.

For example, a sensor (such as 116 in FIG. 1) may measure the delivered discharge capacity at a connection between a load and a set of cells currently connected to the load, or it may measure the current of the set of cells. Alternatively or additionally, the sensor may measure any of the following: a duration of the connection (which may be at least 0.01 seconds in some embodiments), a capacity accumulated over several connections between the load and the set of cells, a voltage of the set of cells and/or of at least one other set of cells, a cutoff discharge voltage of the set of cells, a power of the set of cells, an energy of the set of cells, a number of charge or discharge cycles of the set of cells, an impedance of the set of cells, a rate of voltage fading of the set of cells during the connection, a temperature of the set of cells, and a pressure of the set of cells.

In some embodiments, the criterion may include a sequence in which to discharge the cells or sets of cells. Alternatively or additionally, the criterion may be the value of a function that has any of the above as parameters. According to some embodiments, the criterion does not include a number of prior discharge cycles of the sets of cells.

In some embodiments, if the criterion has been met, representative process 400B may then proceed to act 430, wherein the next set of cells in the battery may be selectively discharged based on the criterion using a multiplexing switch apparatus (such as multiplexing switch apparatus 112 described above). For example, if the current discharging set of cells has met whatever criterion or criteria is required, that set of cells may be disconnected and the next set of cells may be connected (where the next set may be determined by a criterion or criteria which may be the same or different from those discussed above) as described herein. Alternatively, if the criterion has not been met, it may continue to be monitored. According to some embodiments, the connection between a single cell and the load may be at least 0.01 seconds in duration. The inventors have recognized and appreciated that a shorter connection duration than 0.01 seconds may surprisingly produce more noise than at 0.01 seconds and may not allow the electrochemistry of the cell to accomplish anything non-negligible.

In some embodiments, representative process 400B may then optionally proceed to act 431, wherein the multiplexing switch apparatus may be used to isolate a single set of cells for discharging while other sets of cells are not discharging. For example, when a controller (e.g., 114 of FIG. 1) determines that cell 121B should be discharged, it may cause the multiplexing switch apparatus to isolate cell 121B for discharging while cells 121A and 121C are not discharging.

In some embodiments, representative process 400B may then optionally proceed to any of acts 432, 434, 436, and/or 438. For example, if process 400B proceeds from act 431 to act 432, the multiplexing switch apparatus may be used to selectively discharge the sets of cells at a first rate at least 2 times higher than a second rate of charging the sets of cells.

Alternatively or additionally, process 400B may proceed from act 431 to act 434, wherein the multiplexing switch apparatus may be used to selectively discharge the sets of cells at a first rate at least 4 times higher than a second rate of charging the sets of cells.

Alternatively or additionally, process 400B may proceed from act 431 to act 436, wherein discharge of the sets of cells may be temporally overlapping, such as by using the multiplexing switch apparatus as discussed above.

Alternatively or additionally, process 400B may proceed from act 431 to act 438, wherein power may continue to be provided from the sets of cells during switching between different sets.

It should be appreciated that any of acts 431, 432, 434, 436, and/or 438 may actually be integral to act 430, although they are represented as separate acts in FIG. 4B.

In some embodiments, representative process 400B may then optionally proceed to act 440, wherein the multiplexing switch apparatus may be used to charge the sets of cells in parallel, such as is described above.

According to some embodiments, any number of sets of cells, including all the sets of cells in the battery, battery pack, or system, may be discharged simultaneously. For example, with a battery having 4 cells, all 4 cells (or only 2 or 3) could be discharged at the same time, producing whatever discharge current is desirable for the load or application and possible for the cells. Additionally, in some embodiments, the number of cells or sets discharged or charged is selected based on the at least one criterion, such as discharge current for discharging. In certain embodiments, the sequence in which the number of cells or sets of cells is discharged or charged is selected based on the at least one criterion, such as discharge current for discharging. In some embodiments, both the number of cells or sets discharged or charged and the sequence of doing so is selected based on the at least one criterion, such as discharge current for discharging.

In some embodiments, process 400B may then end or repeat as necessary. For example, process 400B may repeat through any suitable number of cycles. According to some embodiments, for each cycle or some cycles, each cell may be discharged once before any cell is discharged twice.

FIG. 5 depicts a representative high-level process 500 for controlling a battery pack. The acts comprising representative process 500 are described in detail in the paragraphs that follow.

In some embodiments, representative process 500 may include act 530, wherein switches may be controlled (e.g., by a controller such as 114 described above) to discharge sets (e.g., 121, 122, 123, and/or 124) of cells (e.g., 121A-C) in the battery pack (e.g., 210) sequentially using an integrated switching control system. Additionally, the multiplexing switch apparatus may be connected to two or more sets of cells of the battery or batteries. Each set of cells may comprise one or more cells.

In some embodiments, process 500 may then end or repeat as necessary.

Figure 6:
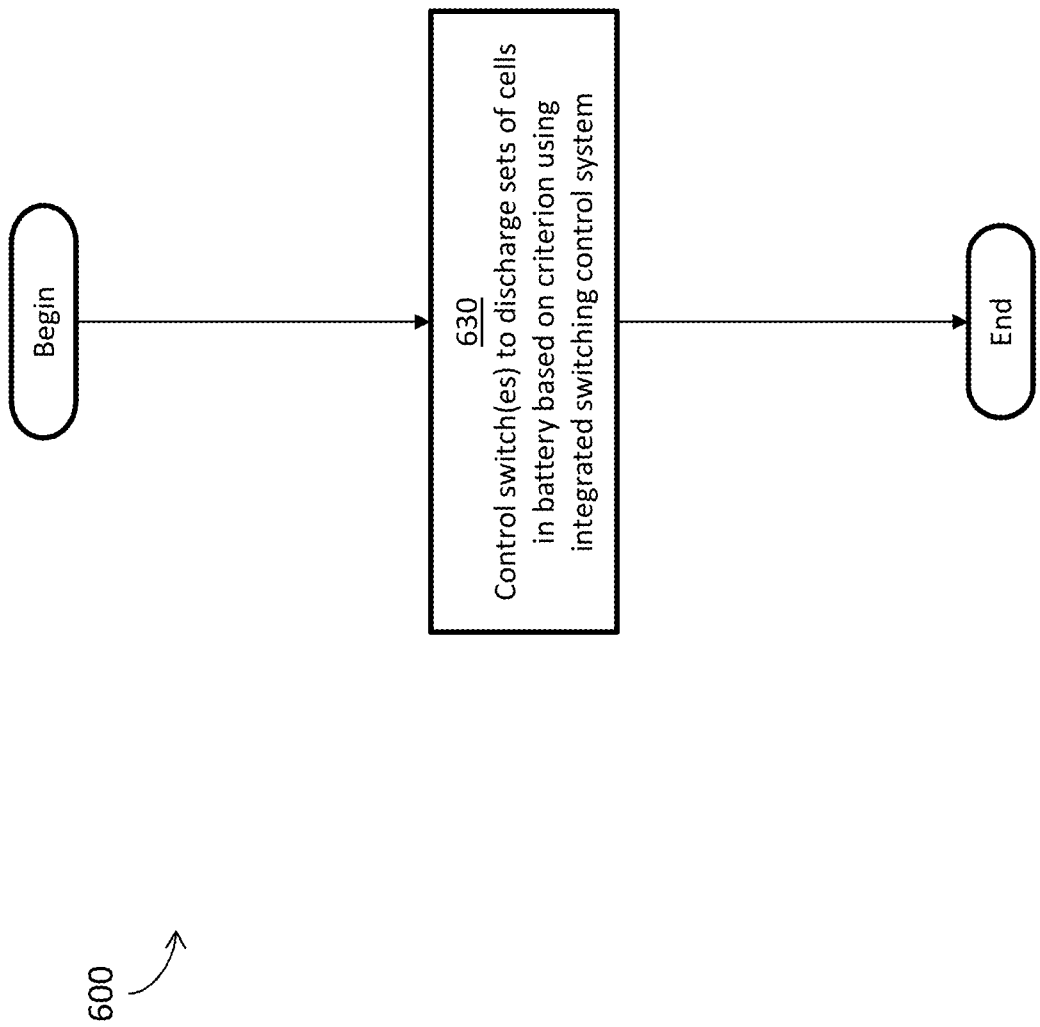
FIG. 6 is a flow chart depicting an additional representative process controlling a battery pack, according to some embodiments.

FIG. 6 depicts a representative high-level process 600 for controlling a battery pack. The acts comprising representative process 600 are described in detail in the paragraphs that follow.

In some embodiments, representative process 600 may include act 630, wherein switches may be controlled (e.g., by a controller such as 114 described above) to discharge sets (e.g., 121, 122, 123, and/or 124) of cells (e.g., 121A-C) in the battery pack (e.g., 210) based on a criterion using an integrated switching control system. Additionally, the multiplexing switch apparatus may be connected to two or more sets of cells of the battery or batteries. Each set of cells may comprise one or more cells. In some embodiments, the criterion may include any of the following: a duration of a connection between a load and a set of cells currently connected to the load, a delivered discharge capacity at the connection, and a value of a function having one or more parameters.

In some embodiments, process 600 may then end or repeat as necessary.

The inventors have recognized and appreciated that some embodiments described above may produce results showing various improvements over conventional techniques when implemented. For example, in one implementation, cells were made of NCMA622 cathode (BASF) with 50 μm Li foil and 25 μm Celgard 2325 separator filled with F9 (BASF) electrolyte containing 1% by weight of LiBOB, with an active electrode area of 99.41 cm². The cells were assembled into 13 batteries containing 4 cells each. The batteries were subjected to 13 electrical charge-discharge cycling tests performed using some embodiments at conditions summarized in Table 1 and Table 2 below. The cells in the batteries were kept at pressure of 12 kg/cm² and temperature of 18° C. during cycling tests.

TABLE 1

Battery test data for 4 cells simultaneously discharged with even current distribution.

| Test # | Battery Discharge Current mA | Battery Charge Current mA | Battery Cycle Life to 800 mAh Cutoff | Battery 5th Cycle Discharge Capacity mAh | Cell Discharge Current mA | Cell Charge Current mA |
|---|---|---|---|---|---|---|
| 1 | 800 | 800 | 29 | 1344 | 200 | 200 |
| 2 | 400 | 400 | 52 | 1380 | 100 | 100 |
| 3 | 300 | 300 | 53 | 1412 | 75 | 75 |

TABLE 2

Battery test data for 4 cells sequentially discharged at various discharge pulse durations.

| Test # | Battery Discharge Current mA | Battery Charge Current mA | Battery Cycle Life to 800 mAh Cutoff | Battery 5th Cycle Discharge Capacity mAh | Cell Discharge Pulse Current mA | Cell Discharge Pulse Duration s | Cell No Current Duration s | Cell Charge Current mA | Level of Cell Discharge at Single Pulse |
|---|---|---|---|---|---|---|---|---|---|
| 4 | 800 | 800 | 94 | 1064 | 800 | 1197 | 0 | 200 | Full |
| 5 | 800 | 800 | 131 | 1208 | 800 | 10 | 30 | 200 | Partial |
| 6 | 800 | 800 | 125 | 1252 | 800 | 1 | 3 | 200 | Partial |
| 7 | 800 | 800 | 46 | 1260 | 800 | 0.1 | 0.3 | 200 | Partial |
| 8 | 400 | 400 | 263 | 1260 | 400 | 2835 | 0 | 100 | Full |
| 9 | 400 | 400 | 283 | 1284 | 400 | 10 | 30 | 100 | Partial |
| 10 | 400 | 400 | 217 | 1352 | 400 | 1 | 3 | 100 | Partial |
| 11 | 400 | 400 | 59 | 1368 | 400 | 0.1 | 0.3 | 100 | Partial |
| 12 | 300 | 300 | 334 | 1304 | 300 | 3912 | 0 | 75 | Full |
| 13 | 300 | 300 | 298 | 1412 | 300 | 10 | 30 | 75 | Partial |

Table 1 (Tests #1-#3) represents comparative examples (as performed by conventional techniques) and summarizes test results when batteries were charged and discharged at constant currents with cells connected in parallel and with charge and discharge currents distributed evenly among 4 cells. Charge cutoff voltage was 4.35 V and discharge cutoff voltage was 3.2 V. Charge-discharge cycling stopped when battery capacity reached 800 mAh.

Table 2 (Tests #4-#13) summarizes test results when batteries were charged to 4.35 V at constant currents with cells connected in parallel and with charge discharge currents distributed evenly among 4 cells. Discharge of these batteries was performed in a way that the battery as a whole experienced constant discharge current. However, individual cells were connected to and disconnected from the load sequentially, providing discharge current pulse only for one of four cells at a time. At the end of this pulse, the next cell was connected and the previous one was disconnected. Cells experienced discharge pulses in sequences (e.g., Cell #1, 2, 3, 4, 1, 2, 3, 4, etc.) during a certain pulse time or until discharge voltage reached 3.2 V. Tests #4, #8, and #12 provided full cell discharge at single pulse. Other tests provided partial cell discharge at single pulse with durations of 0.1, 1, and 10 s. Charge-discharge cycling stopped when battery capacity reached 800 mAh.

Figure 7A:
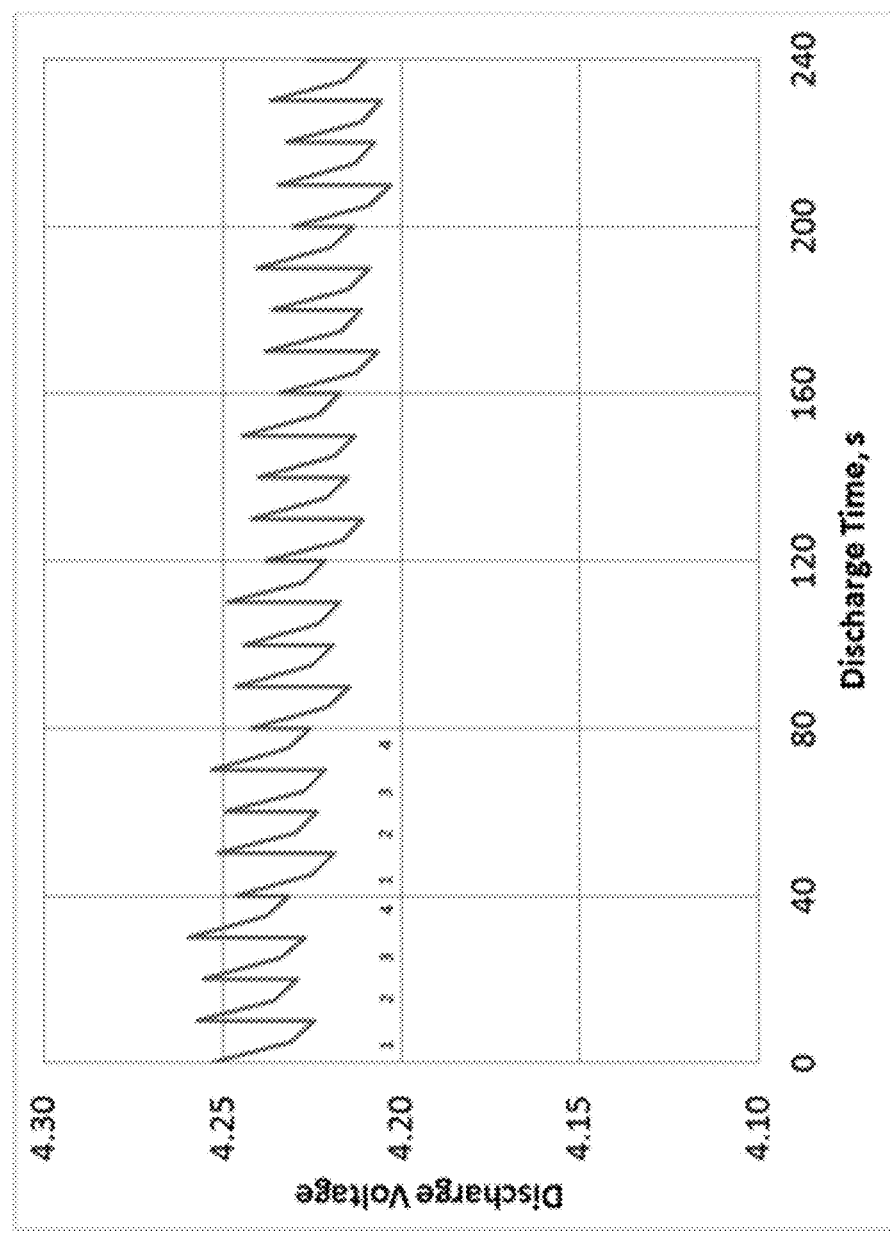
FIG. 7A is a chart depicting an exemplary discharge profile, according to some embodiments.
Figure 7B:
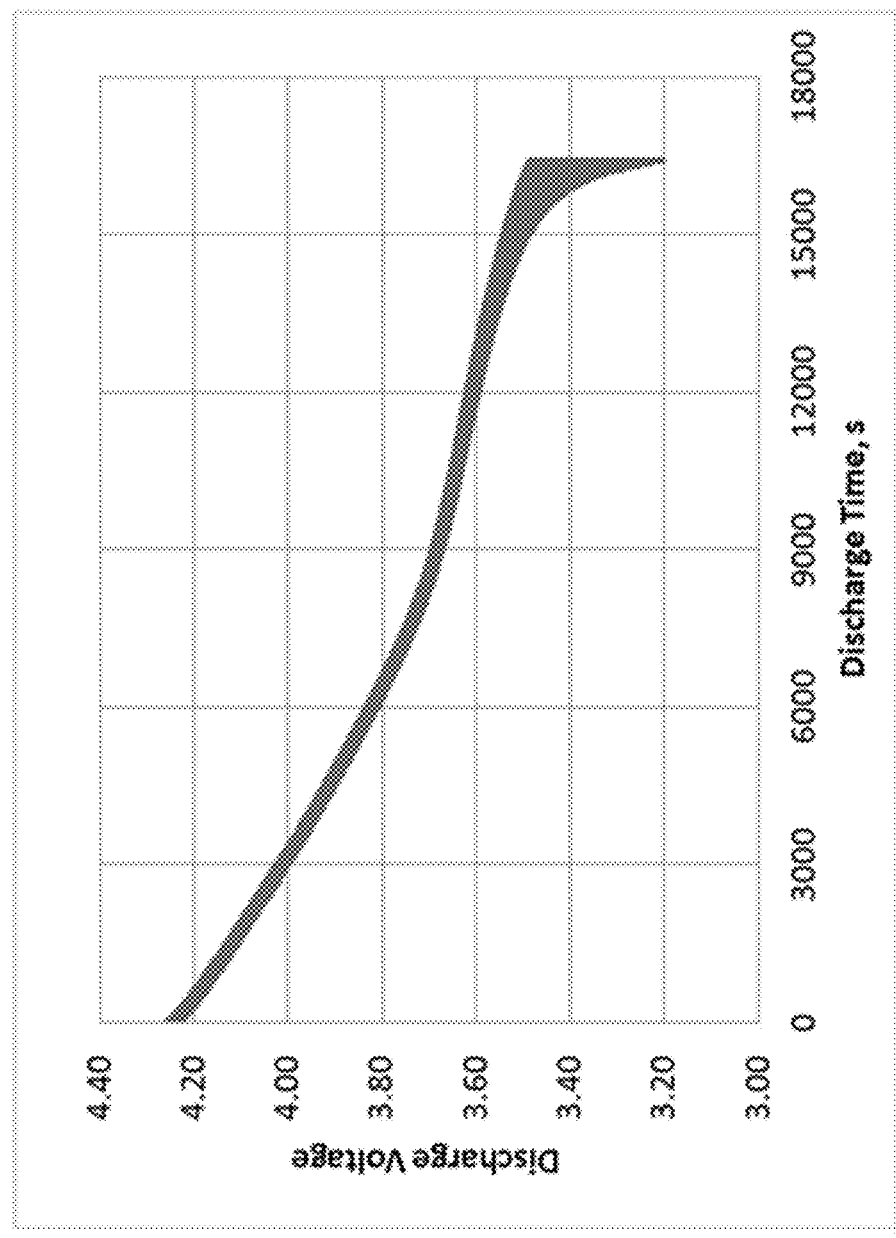
FIG. 7B is a chart depicting an exemplary full discharge profile, according to some embodiments.

FIG. 7A, corresponding to Test #13, shows the battery voltage profile at the beginning of the 10 second pulse discharge for the first 240 seconds, and FIG. 7B shows the full discharge profile to a voltage of 3.2 V. In FIG. 7A, the cell numbers affected by the 10 second 300 mA pulses at repeated sequences are shown for the first 80 seconds.

Figure 7C:
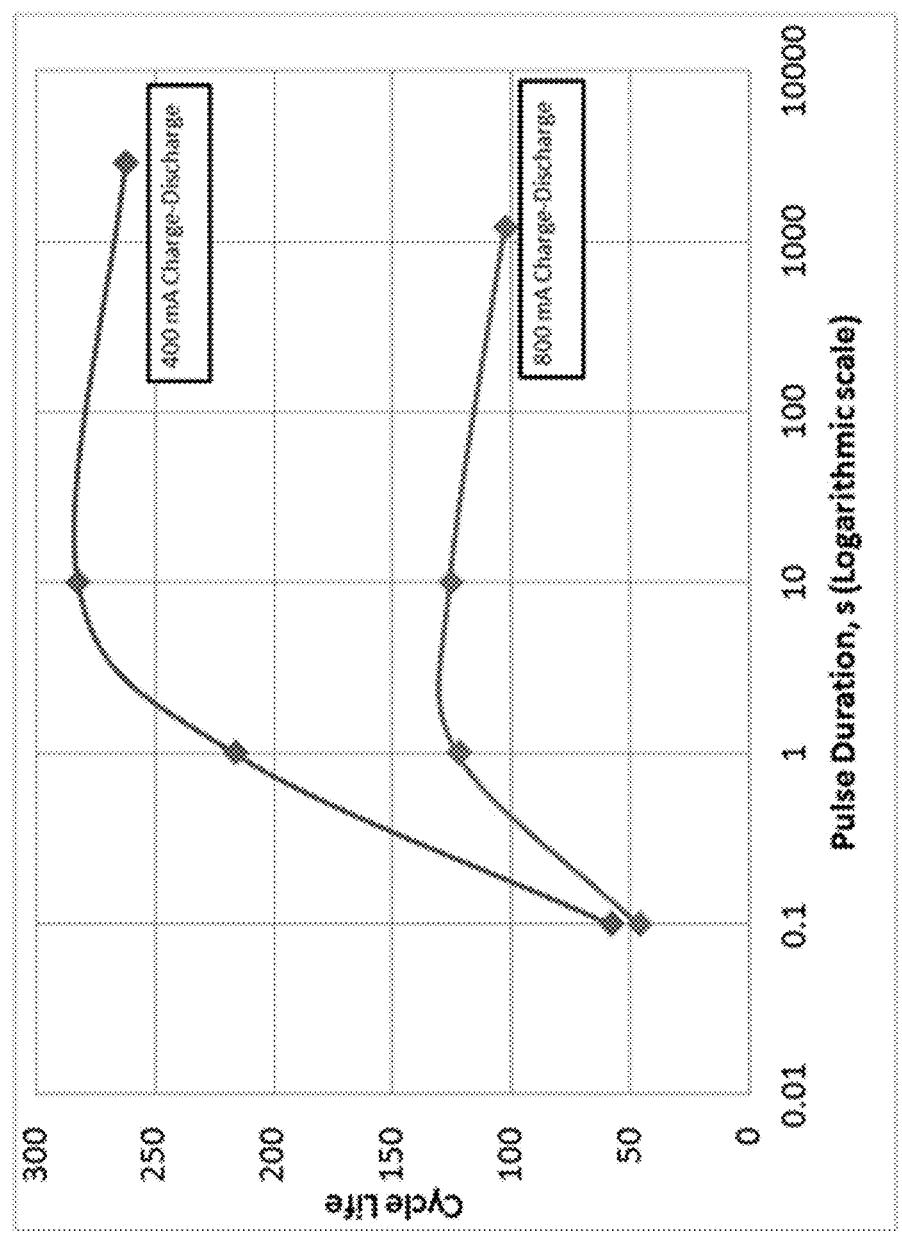
FIG. 7C is a chart depicting an exemplary battery cycle life, according to some embodiments.

Referring back to Table 1 and Table 2, the inventors have recognized and appreciated that applying whole battery discharge current to the portion of the battery cells in sequence (Table 2) has led to surprising and dramatic cycle life improvement compared with homogeneous current distribution among all battery cells (Table 1), as has been done in conventional techniques. This cycle life improvement may be up to six-fold, and the inventors recognized it may be a function of discharge pulse duration as well as charge-discharge rate. FIG. 7C, which illustrates battery cycle life as a function of pulse duration at two charge-discharge rates (corresponding to Tests #4-#11), shows that cycle life may be especially improved with pulse time longer than 0.1 seconds and pulse duration around 10 seconds. The inventors have recognized and appreciated that improvements to battery cycle life described herein are even available using some embodiments at partial discharge, as FIG. 7C shows and as would not have been expected based on experience with conventional techniques. Additionally, the full capacity of all cells, even when far from uniform, can be utilized with some embodiments.

It should be appreciated that, in some embodiments, the methods described above with reference to FIGS. 4A-6 may vary, in any of numerous ways. For example, in some embodiments, the steps of the methods described above may be performed in a different sequence than that which is described, a method may involve additional steps not described above, and/or a method may not involve all of the steps described above.

Figure 8:
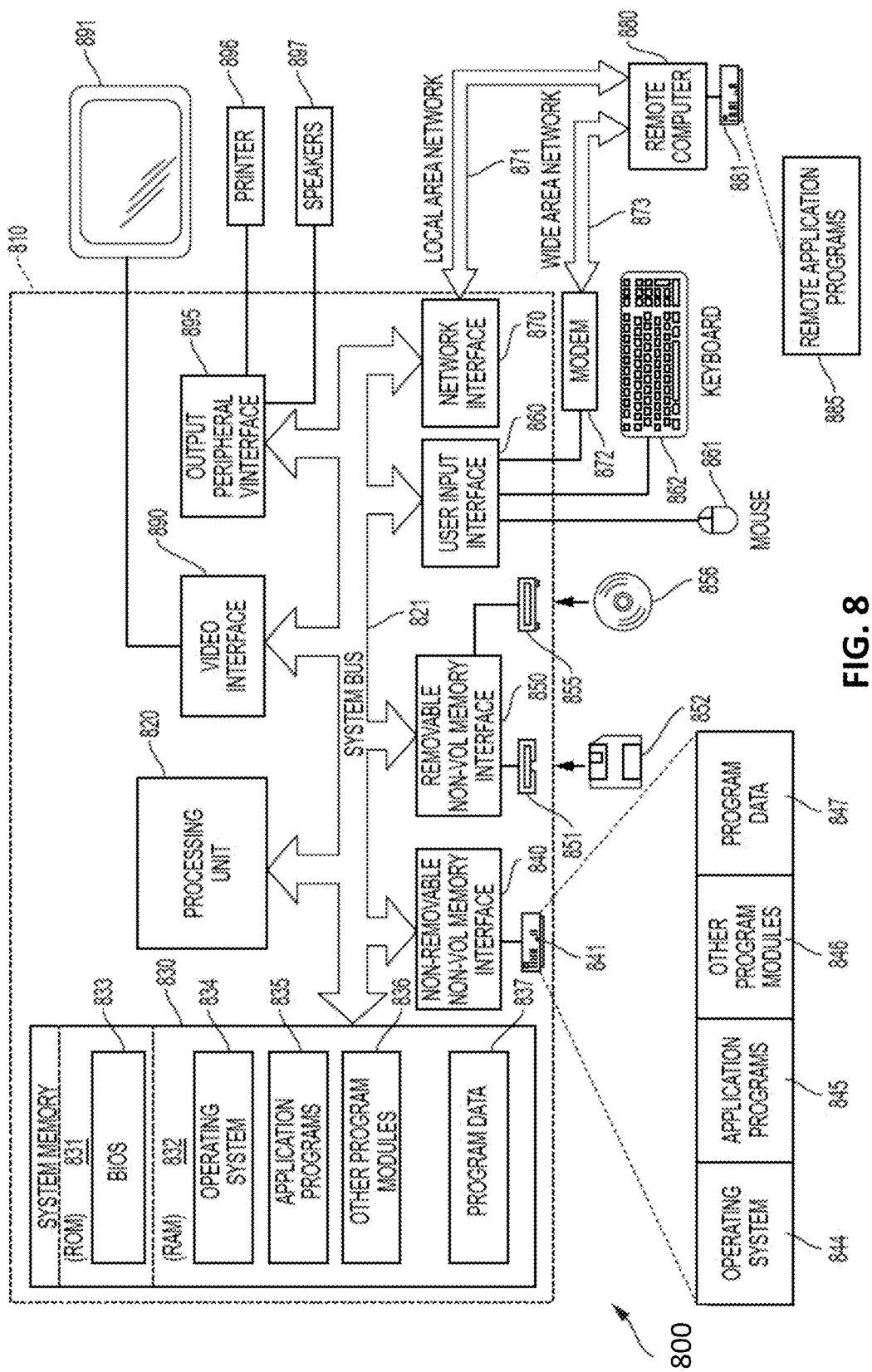
FIG. 8 is a block diagram depicting a representative computing system that may be used to implement certain aspects.

It should further be appreciated from the foregoing description that some aspects may be implemented using a computing device. FIG. 8 depicts a general purpose computing device in system 800, in the form of a computer 810, which may be used to implement certain aspects, such as any of the controllers described above (e.g., 114).

In computer 810, components include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media that may be used to store the desired information and may be accessed by computer 810. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 839 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 859 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 849, and program data 847. Note that these components can either be the same as or different from operating system 834, application programs 835, other program modules 539, and program data 837. Operating system 844, application programs 845, other program modules 849, and program data 847 are given different numbers here to illustrate that, at a minimum, they are different copies. A user may enter commands and information into the computer 810 through input devices such as a keyboard 892 and pointing device 891, commonly referred to as a mouse, trackball or touch pad. Other input devices (not shown) may include a microphone, joystick, game pad, satellite dish, scanner, or the like. These and other input devices are often connected to the processing unit 820 through a user input interface 590 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 899, which may be connected through a output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 890, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, some embodiments may be embodied as a computer readable medium other than a computer-readable storage medium. Examples of computer readable media that are not computer readable storage media include transitory media, like propagating signals.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention may include each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less)

acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A battery management system comprising:
   at least one battery comprising two or more sets of cells, each set of cells comprising one or more cells;
   a multiplexing switch apparatus connected to each set of cells; and
   at least one controller configured to use the multiplexing switch apparatus to selectively discharge the sets of cells at a discharging rate at least 2 times higher than a charging rate of the sets of cells;
   wherein for a given cycle, each cell is discharged once before any cell is discharged twice.

2. The battery management system of claim 1, wherein the discharging rate is 4 times higher than the charging rate.

3. The battery management system of claim 1, wherein the at least one controller is configured to temporally overlap the discharge of the sets of cells.

4. The battery management system of claim 1, wherein the at least one controller is configured to continue to provide power from the sets of cells during switching between different sets.

5. The battery management system of claim 1, wherein at least one controller is configured to use the multiplexing switch apparatus to apply the charging rate of the sets of cells prior to the discharging rate.

6. A battery pack comprising:
   at least one battery comprising two or more sets of cells, each set of cells comprising one or more cells; and
   an integrated switching control system comprising at least one switch connected to each set of cells,
   wherein:
     the integrated switching control system is configured to control the at least one switch to discharge the sets of cells at a discharging rate at least 2 times higher than a charging rate of the sets of cells, and
     for a given cycle, each cell is discharged once before any cell is discharged twice.

7. The battery pack of claim 6, wherein the discharging rate is 4 times higher than the charging rate.

8. The battery pack of claim 6, wherein the integrated switching control system is configured to control the at least one switch to temporally overlap the discharge of the sets of cells.

9. The battery pack of claim 6, wherein the integrated switching control system is configured to control the at least one switch to continue to provide power from the sets of cells during switching between different sets.

10. A battery management method comprising:
    using a multiplexing switch apparatus, which is connected to two or more sets of cells of at least one battery, to selectively discharge each set of cells at a discharging rate at least 2 times higher than a charging rate of the sets of cells,
    wherein:
      each set of cells comprises one or more cells, and
      for a given cycle, each cell is discharged once before any cell is discharged twice.

11. The battery management method of claim 10, wherein the discharging rate is 4 times higher than the charging rate.

12. The battery management method of claim 10, further comprising temporally overlapping discharge of sets of cells.

13. The battery mannagement method of claim 10, further comprising continuing to provide power from the sets of cells during switching between different sets.

14. An electrochemical cell controlled by the battery management method of claim 10.

15. A rechargeable battery comprising the electrochemical cell of claim 14.

16. A vehicle comprising the rechargeable battery of claim 15.

17. A vehicle comprising the electrochemical cell of claim 14.

* * * * *

UNITED STATES PATENT AND TRADEMARK OFFICE
CERTIFICATE OF CORRECTION

PATENT NO. : 11,489,348 B2  
APPLICATION NO. : 16/527903  
DATED : November 1, 2022  
INVENTOR(S) : Yuriy V. Mikhaylik et al.

Page 1 of 1

It is certified that error appears in the above-identified patent and that said Letters Patent is hereby corrected as shown below:

In the Claims

Column 32, Claim 13, Line 36, "The battery mannagement" should be --The battery management--

Signed and Sealed this
Tenth Day of January, 2023

Katherine Kelly Vidal
*Director of the United States Patent and Trademark Office*